(12) United States Patent
Feng et al.

(10) Patent No.: US 11,709,341 B2
(45) Date of Patent: Jul. 25, 2023

(54) OPTICAL IMAGING LENS ASSEMBLY

(71) Applicant: Zhejiang Sunny Optical Co., Ltd, Ningbo (CN)

(72) Inventors: Tao Feng, Ningbo (CN); Liefeng Zhao, Ningbo (CN); Fujian Dai, Ningbo (CN)

(73) Assignee: Zhejiang Sunny Optical Co., Ltd

( * ) Notice: Subject to any disclaimer, the term of this patent is extended or adjusted under 35 U.S.C. 154(b) by 334 days.

(21) Appl. No.: 16/928,470

(22) Filed: Jul. 14, 2020

(65) Prior Publication Data

US 2021/0018726 A1 Jan. 21, 2021

(30) Foreign Application Priority Data

Jul. 15, 2019 (CN) .......................... 201910634107.4

(51) Int. Cl.
*G02B 13/00* (2006.01)
*G02B 9/62* (2006.01)
*G02B 27/00* (2006.01)

(52) U.S. Cl.
CPC ........... *G02B 13/0045* (2013.01); *G02B 9/62* (2013.01); *G02B 27/0025* (2013.01)

(58) Field of Classification Search
CPC .. G02B 13/06; G02B 13/0045; G02B 15/146; G02B 27/0025; G02B 9/62; G02B 9/64; H04N 5/222; H04N 5/2254

USPC ......... 359/656–658, 708, 713, 749, 756–762
See application file for complete search history.

(56) References Cited

U.S. PATENT DOCUMENTS

2019/0121064 A1   4/2019   Zhang et al.

FOREIGN PATENT DOCUMENTS

WO    WO-2018103250 A1 *  6/2018  ......... G02B 13/0045

* cited by examiner

*Primary Examiner* — Travis S Fissel
(74) *Attorney, Agent, or Firm* — Barnes & Thornburg LLP

(57) ABSTRACT

The present disclosure discloses an optical imaging lens assembly which includes, sequentially from an object side to an image side along an optical axis, a first lens having a refractive power with a concave image-side surface; a second lens having a refractive power; a third lens having a positive refractive power; a fourth lens having a refractive power; a fifth lens having a positive refractive power with a convex image-side surface; and a sixth lens having a positive refractive power with a convex object-side surface and a concave image-side surface, wherein half of a maximum field-of-view angle HFOV of the optical imaging lens assembly satisfies: HFOV>55°, and a distance TTL from an object-side surface of the first lens to an imaging plane along the optical axis and half of a diagonal length ImgH of an effective pixel area on the imaging plane satisfy: 1.2<TTL/ImgH<2.3.

18 Claims, 7 Drawing Sheets

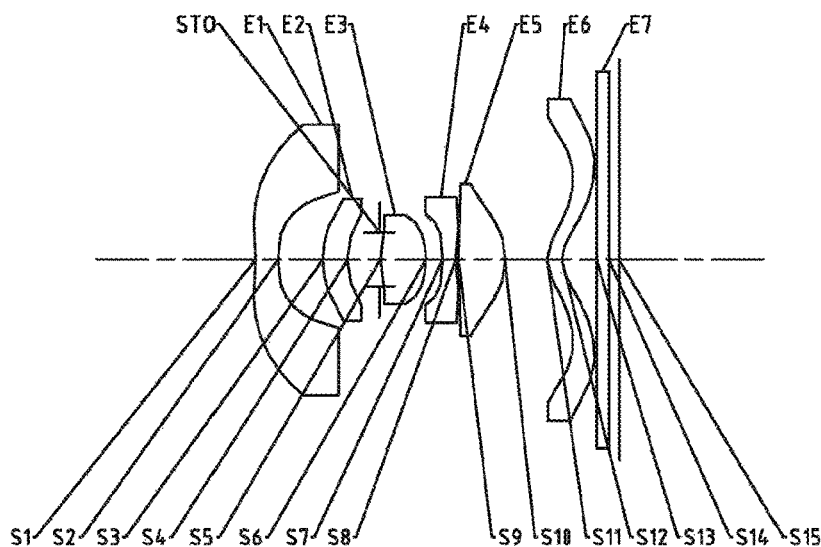
Fig. 5
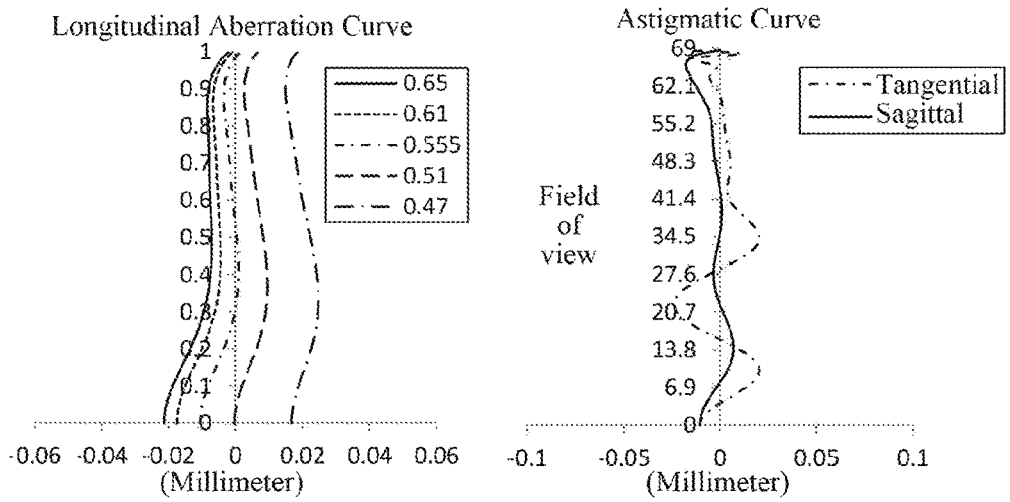
Fig. 6A
Fig. 6B
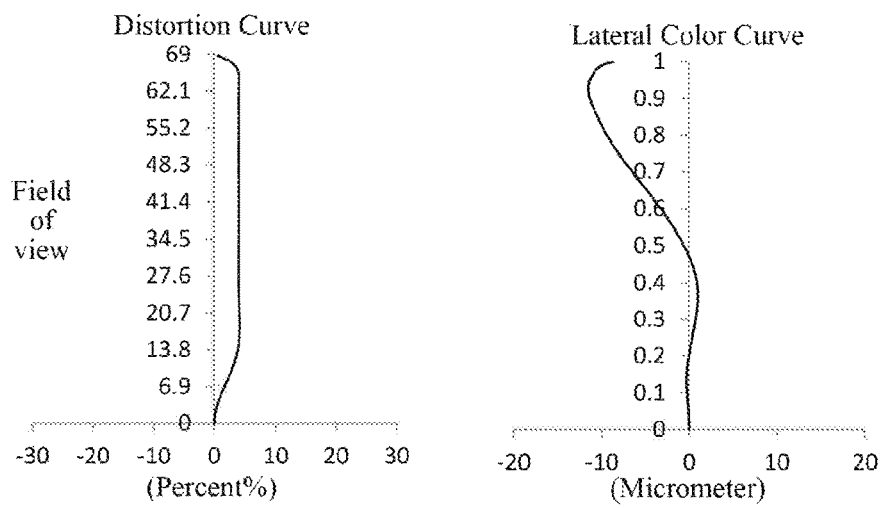
Fig. 6C
Fig. 6D

OPTICAL IMAGING LENS ASSEMBLY

CROSS-REFERENCE TO RELATED APPLICATION

This application claims benefit of priority to Chinese Patent Application No. 201910634107.4 filed on Jul. 15, 2019 before the China National Intellectual Property Administration, the entire disclosure of which is incorporated herein by reference in its entity.

TECHNICAL FIELD

The present disclosure relates to an optical imaging lens assembly, and more particularly, to an optical imaging lens assembly including six lenses.

BACKGROUND

In recent years, imaging lenses based on CMOS and CCD have been widely used in various fields. In particular, wide-angle lenses, including ultra-wide-angle lenses and fish-eye lenses, play an important role in more and more occasions. In terms of camera, the wide-angle lens has the characteristics of short focal length and large field of view, which can generate a large barrel-shaped distortion to create a special effect and bring a strong visual impact to an observer. In terms of measurement, a wide-angle lens with a large field-of-view feature can acquire more data in a single shot to capture more scene information. At the same time, market requirements for the miniaturization of lenses are increasing. However, the constant reduction in lens size can affect the imaging quality of the lens, especially for wide-angle lenses with large field-of-view. Accordingly, there is a need for a high-quality imaging lens having both large field-of-view angle and miniaturization.

SUMMARY

The present disclosure provides an optical imaging lens assembly applicable to a portable electronic product that at least solves or partially solves at least one of the above-mentioned disadvantages of the prior art.

An aspect of the present disclosure provides an optical imaging lens assembly including, sequentially along an optical axis from an object side to an image side, a first lens having a refractive power with a concave image-side surface; a second lens having a refractive power; a third lens having a positive refractive power; a fourth lens having a refractive power; a fifth lens having a positive refractive power with a convex image-side surface; and a sixth lens having a positive refractive power with a convex object-side surface and a concave image-side surface.

In one embodiment, half of a maximum field-of-view angle HFOV of the optical imaging lens assembly may satisfy: HFOV>55°.

In one embodiment, a distance TTL from an object-side surface of the first lens to an imaging plane of the optical imaging lens assembly along the optical axis and half of a diagonal length ImgH of an effective pixel area of the imaging plane of the optical imaging lens assembly may satisfy: 1.2<TTL/ImgH<2.3.

In one embodiment, a maximum effective radius DT11 of an object-side surface of the first lens and a maximum effective radius DT62 of the image-side surface of the sixth lens may satisfy: 0.5<DT11/DT62≤1.05.

In one embodiment, a radius of curvature R1 of an object-side surface of the first lens and an effective focal length f1 of the first lens may satisfy: 0.54≤|R1/f1|<1.2.

In one embodiment, an on-axis distance SAG41 between an intersection of an object-side surface of the fourth lens and the optical axis and a vertex of an effective radius of the object-side surface of the fourth lens, and an on-axis distance SAG52 between an intersection of the image-side surface of the fifth lens and the optical axis and a vertex of an effective radius of the image-side surface of the fifth lens may satisfy 0<SAG41/SAG52≤1.

In one embodiment, an effective focal length f5 of the fifth lens, an effective focal length f6 of the sixth lens, and a total effective focal length f of the optical imaging lens assembly may satisfy: 0<(f5/f6)*f<0.5 mm.

In one embodiment, a radius of curvature R5 of an object-side surface of the third lens, a radius of curvature R6 of an image-side surface of the third lens, and an effective focal length f3 of the third lens may satisfy: 0.2<f3/(R5−R6)<0.6.

In one embodiment, a radius of curvature R10 of the image-side surface of the fifth lens and an effective focal length f5 of the fifth lens may satisfy: −0.96≤R10/f5≤0.1.

In one embodiment, a radius of curvature R11 of the object-side surface of the sixth lens, a radius of curvature R12 of the image-side surface of the sixth lens, and a total effective focal length f of the optical imaging lens assembly may satisfy: 0.5<(R11+R12)/f≤1.1.

In one embodiment, a spaced interval T12 between the first lens and the second lens along the optical axis, a spaced interval T23 between the second lens and the third lens along the optical axis, a spaced interval T34 between the third lens and the fourth lens along the optical axis, and a distance TTL from an object-side surface of the first lens to an imaging plane of the optical imaging lens assembly along the optical axis may satisfy 0<(T12+T23+T34)/TTL<0.5.

In one embodiment, a center thickness CT2 of the second lens along the optical axis, a center thickness CT3 of the third lens along the optical axis, and a center thickness CT4 of the fourth lens along the optical axis may satisfy 0.4<(CT2+CT4)/CT3<1.2.

In one embodiment, a center thickness CT1 of the first lens along the optical axis and a center thickness CT6 of the sixth lens along the optical axis may satisfy: 0.5<CT1/CT6<1.5.

The optical imaging lens assembly provided in the present disclosure is provided with a plurality of lens, including a first lens to a sixth lens. Half of the maximum field-of-view angle of the optical imaging lens assembly is greater than 55°, and the ratio of the distance from the object-side surface of the first lens to the imaging plane of the optical imaging lens assembly along the optical axis to half of the diagonal length of the effective pixel area on the imaging plane of the optical imaging lens assembly is between 1.2 and 2.3. By optimizing the arrangement of the refractive power and the shape type of each lens, the optical imaging lens assembly has the characteristics of large field-of-view angle and miniaturization.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings:

FIG. 5 shows a schematic structural diagram of an optical imaging lens assembly according to Example 3 of the present disclosure;

FIGS. 6A to 6D show a longitudinal aberration curve, an astigmatic curve, a distortion curve, and a lateral color curve, respectively, of the optical imaging lens assembly of Example 3;

DETAILED DESCRIPTION OF EMBODIMENTS

Figure 1:
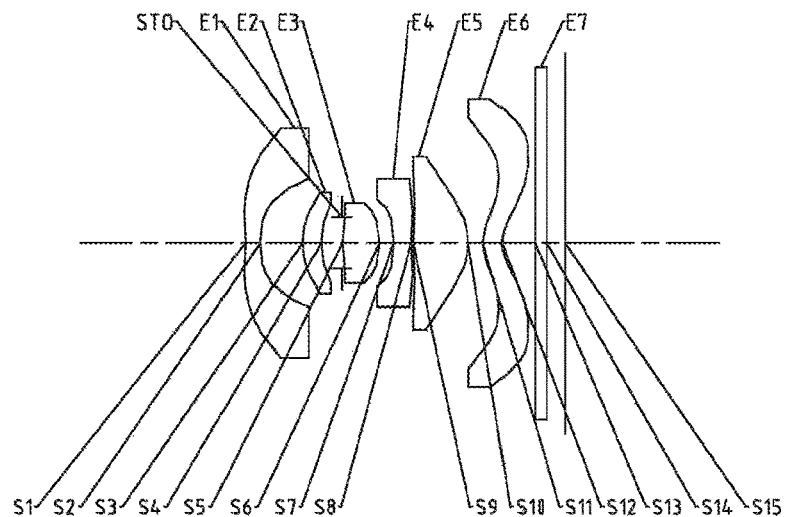
FIG. 1 shows a schematic structural diagram of an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

In order to meet market demands, the present disclosure intends to provide an optical imaging lens assembly having both a large field of view angle and miniaturization.

An optical imaging lens assembly according to an exemplary embodiment of the present disclosure may include six lenses having refractive power, that is, a first lens, a second lens, a third lens, a fourth lens, a fifth lens, and a sixth lens. The six lenses are arranged sequentially along the optical axis from the object side to the image side.

In an exemplary embodiment, the first lens may have a negative refractive power with a concave image-side surface; the second lens may have a positive refractive power or a negative refractive power; the third lens may have a positive refractive power; the fourth lens may have a positive refractive power or a negative refractive power; the fifth lens may have a positive refractive power with a convex image-side surface; and the sixth lens may have a positive refractive power with a convex object-side surface and a concave image-side surface.

In an exemplary embodiment, half of a maximum field-of-view angle HFOV of the optical imaging lens assembly may satisfy: HFOV>55°. More specifically, HFOV may satisfy HFOV>60°. Satisfying HFOV>55° is advantageous to realize wide-angle. Half of the maximum field-of-view angle of the optical imaging lens assembly is greater than 55 degrees, which makes the lens have a large field-of-view angle, so that a large barrel distortion can be generated during imaging to create a special visual effect. At the same time, more scene information can be acquired by single capturing.

In an exemplary embodiment, a distance TTL from an object-side surface of the first lens to an imaging plane of the optical imaging lens assembly along the optical axis and half of a diagonal length ImgH of an effective pixel area on the imaging plane of the optical imaging lens assembly may satisfy: 1.2<TTL/ImgH<2.3. More specifically, TTL and ImgH may satisfy: 1.5<TTL/ImgH<2.0. The ratio of the distance from the object-side surface of the first lens to the imaging plane of the optical imaging lens assembly along the optical axis to half of the diagonal length of the effective pixel area on the imaging plane of the optical imaging lens assembly is between 1.2 and 2.3, which facilitates shortening the system length of the optical imaging lens assembly and miniaturization of the lens.

In an exemplary embodiment, a maximum effective radius DT11 of an object-side surface of the first lens and a maximum effective radius DT62 of an image-side surface of the sixth lens may satisfy: 0.5<DT11/DT62≤1.05. More specifically, DT11 and DT62 may satisfy 0.7<DT11/DT62≤1.05. Controlling the ratio of the maximum effective radius of the object-side surface of the first lens to the maximum effective radius of the image-side surface of the sixth lens to be within a reasonable numerical range facilitates the optical system assembly process and the correction of off-axis aberrations.

In an exemplary embodiment, a radius of curvature R1 of an object-side surface of the first lens and an effective focal length f1 of the first lens may satisfy: 0.54≤|R1/f1|<1.2. More specifically, R1 and f1 may satisfy 0.54≤|R1/f1|<1.0. The ratio of the radius of curvature of the object-side surface of the first lens to the effective focal length of the first lens is reasonably controlled, and the angle of incident light to the optical imaging lens assembly is adjusted, thereby facilitating increasing the angle of the field-of-view of the lens and correcting the aberration of the system.

In an exemplary embodiment, an on-axis distance SAG41 between an intersection of an object-side surface of the fourth lens and the optical axis and a vertex of an effective radius of the object-side surface of the fourth lens, and an on-axis distance SAG52 between an intersection of an image-side surface of the fifth lens and the optical axis and a vertex of an effective radius of the image-side surface of the fifth lens may satisfy: 0<SAG41/SAG52≤1. More specifically, SAG41 and SAG52 may satisfy: 0.3<SAG41/SAG52≤1. Reasonable control of the ratio between the aforementioned two parameters is advantageous in reducing the processing difficulty of the lens and reducing the generation of ghosts.

In an exemplary embodiment, an effective focal length f5 of the fifth lens, an effective focal length f6 of the sixth lens, and a total effective focal length f of the optical imaging lens assembly may satisfy: 0<(f5/f6)*f<0.5 mm, for example, 0<(f5/f6)*f<0.3 mm. Reasonably controlling the relationship among the aforementioned three parameters and adjusting the angle of incident light to the optical imaging lens assembly are advantageous to increase the field-of-view angle of the lens and to correct the aberration of the system.

In an exemplary embodiment, a radius of curvature R5 of an object-side surface of the third lens, a radius of curvature R6 of an image-side surface of the third lens, and an effective focal length f3 of the third lens may satisfy: 0.2<f3/(R5−R6)<0.6, for example, 0.4<f3/(R5−R6)<0.5. Reasonable control of the relationship among the aforementioned three parameters can reduce the high-level coma and meridian high-level astigmatism of the system, thereby improving the imaging quality of the lens.

In an exemplary embodiment, a radius of curvature R10 of an image-side surface of the fifth lens and an effective focal length f5 of the fifth lens may satisfy: −0.96≤R10/f5<0.1, for example, −0.96≤R10/f5<−0.5. Reasonable control of the ratio of the radius of curvature of the image-side surface of the fifth lens to the effective focal length of the fifth lens facilitates correction of the chromatic aberration of the optical imaging lens assembly, improvement of the imaging quality of the lens, and reduction of the system sensitivity.

In an exemplary embodiment, a radius of curvature R11 of an object-side surface of the sixth lens, a radius of curvature R12 of an image-side surface of the sixth lens, and a total effective focal length f of the optical imaging lens assembly may satisfy: 0.5<(R11+R12)/f≤1.1. More specifically, R12 and f may satisfy: 0.75<(R11+R12)/f≤1.1. By reasonable setting the relationship among the above-mentioned three parameters, the incident ray angle of the optical imaging lens assembly is adjusted to match the chip CRA (Chief Ray Angle), and the astigmatism of the system can be effectively corrected, thereby reducing distortion.

In the exemplary embodiment, a spaced interval T12 between the first lens and the second lens along the optical axis, a spaced interval T23 between the second lens and the third lens along the optical axis, a spaced interval T34 between the third lens and the fourth lens along the optical axis, and a distance TTL from an object-side surface of the first lens to an imaging plane of the optical imaging lens assembly along the optical axis may satisfy: 0<(T12+T23+T34)/TTL<0.5. More specifically, T12, T23, T34, and TTL may satisfy: 0.2<(T12+T23+T34)/TTL<0.3. In a scenario where the overall length of the optical imaging lens assembly being equal, when the air gap between each adjacent lenses of the first lens to the fourth lens is reasonably controlled, there are the following advantages: ensure the size distribution of each lens and the miniaturization of the system, ensure a good assembling process and correct the off-axis aberrations, reduce the risk of ghost images of the system, and improve the imaging quality.

In an exemplary embodiment, a center thickness CT2 of the second lens along the optical axis, a center thickness CT3 of the third lens along the optical axis, and a center thickness CT4 of the fourth lens along the optical axis may satisfy: 0.4<(CT2+CT4)/CT3<1.2. Reasonable control of the relationship among the above-mentioned three parameters is advantageous in both reducing the processing difficulty of each lens and facilitating the miniaturization of the lens.

In an exemplary embodiment, a center thickness CT1 of the first lens along the optical axis, and a center thickness CT6 of the sixth lens along the optical axis may satisfy:

$0.5<CT1/CT6 \leq 1.5$. The ratio of the center thickness of the first lens along the optical axis to the center thickness of the sixth lens along the optical axis is controlled to be within a reasonable value range, so that the thicknesses of the first lens and the sixth lens are uniform, thereby facilitating assembly and miniaturization of the optical imaging lens assembly.

In an exemplary embodiment, the above-described optical imaging lens assembly may also include a stop. The stop may be provided in an appropriate position as desired, for example, between the second lens and the third lens. Optionally, the above-described optical imaging lens assembly may further include a filter for correcting color deviations and/or a protective glass for protecting the photosensitive element located on the imaging plane.

In an exemplary embodiment, the object-side surface and the image-side surface of all lenses in the optical imaging lens assembly of the present disclosure may be selected as aspheric surfaces. The aspheric lens is characterized in that the curvature varies continuously from the center of the lens to the periphery of the lens. Unlike spherical lenses having a constant curvature from the center of the lens to the periphery of the lens, aspheric lenses have better radius of curvature characteristics, and have the advantages of reducing aberration and astigmatism. With the aspheric lens, the aberrations that occur during imaging may be eliminated as much as possible, and thus improving the image quality. For example, at least one of the object-side surface of the first lens to the image-side surface of the sixth lens may be an aspheric surface.

An exemplary embodiment of the present disclosure further provides an imaging apparatus including the optical imaging lens assembly described above.

An exemplary embodiment of the present disclosure also provides an electronic device including the imaging apparatus described above.

However, it will be appreciated by those skilled in the art that the number of lenses constituting the optical imaging lens assembly may be varied without departing from the claimed technical solution of the present disclosure to obtain the various results and advantages described in this specification. For example, although six lenses have been described in the embodiment, the optical imaging lens assembly is not limited to include six lenses. If desired, the optical imaging lens assembly may also include other numbers of lenses.

Some specific examples of an optical imaging lens assembly applicable to the above-described embodiment will be further described below with reference to the accompanying drawings.

Example 1

An optical imaging lens assembly according to Example 1 of the present disclosure is described below with reference to FIGS. 1 to 2D. FIG. 1 is a schematic structural diagram showing an optical imaging lens assembly according to Example 1 of the present disclosure.

As shown in FIG. 1, the optical imaging lens assembly includes a first lens E1, a second lens E2, a stop STO, a third lens E3, a fourth lens E4, a fifth lens E5, a sixth lens E6, a filter E7, and an imaging plane S15, which are sequentially arranged from an object side to an image side along an optical axis.

The first lens E1 has a negative refractive power, an object-side surface S1 thereof is a concave surface and an image-side surface S2 thereof is a concave surface. The second lens E2 has a positive refractive power, an object-side surface S3 thereof is a convex surface and an image-side surface S4 thereof is a concave surface. The third lens E3 has a positive refractive power, an object-side surface S5 thereof is a convex surface and an image-side surface S6 thereof is a convex surface. The fourth lens E4 has a negative refractive power, an object-side surface S7 thereof is a concave surface and an image-side surface S8 thereof is a concave surface. The fifth lens E5 has a positive refractive power, an object-side surface S9 thereof is a convex surface and an image-side surface S10 thereof is a convex surface. The sixth lens E6 has a positive refractive power, an object-side surface S11 thereof is a convex surface and an image-side surface S12 thereof is a concave surface. The filter E7 has an object-side surface S13 and an image-side surface S14. Light from the object sequentially passes through the respective surfaces S1 to S14 and is finally imaged on the imaging plane S15.

Table 1 shows a basic parameter table of the optical imaging lens assembly of Example 1, wherein the radius of curvature, the thickness, and the focal length are all in units of millimeters (mm).

TABLE 1

| Surface No. | Surface type | Radius of curvature | Thickness/ Distance | Material Refractive index | Abbe number | Focal length | Conic coefficient |
|---|---|---|---|---|---|---|---|
| OBJ | Spherical | Infinity | Infinity | | | | |
| S1 | Aspheric | −2.2214 | 0.2640 | 1.55 | 56.11 | −2.39 | −54.6717 |
| S2 | Aspheric | 3.2794 | 0.7607 | | | | 6.8343 |
| S3 | Aspheric | 1.4889 | 0.3396 | 1.68 | 19.25 | 7.45 | 0.2200 |
| S4 | Aspheric | 1.9171 | 0.3691 | | | | 1.2430 |
| STO | Spherical | Infinity | 0.0100 | | | | |
| S5 | Aspheric | 2.6109 | 0.6667 | 1.55 | 56.11 | 1.93 | −5.9122 |
| S6 | Aspheric | −1.6125 | 0.2539 | | | | 3.0543 |
| S7 | Aspheric | −5.0227 | 0.3148 | 1.68 | 19.25 | −1.99 | 37.9475 |
| S8 | Aspheric | 1.8924 | 0.0366 | | | | −34.3592 |
| S9 | Aspheric | 2.9394 | 0.9852 | 1.55 | 56.11 | 2.06 | −53.3381 |
| S10 | Aspheric | −1.6077 | 0.2638 | | | | −0.0790 |
| S11 | Aspheric | 0.7115 | 0.3439 | 1.55 | 56.11 | 13.33 | −3.8787 |
| S12 | Aspheric | 0.6540 | 0.5917 | | | | −2.1124 |
| S13 | Spherical | Infinity | 0.2100 | 1.52 | 64.17 | | |
| S14 | Spherical | Infinity | 0.3291 | | | | |
| S15 | Spherical | Infinity | | | | | |

In the present example, a total effective focal length of the optical imaging lens assembly satisfies f=1.46 mm, a distance from the object-side surface S1 of the first lens E1 to the imaging plane S15 along the optical axis satisfies TTL=5.74 mm, half of a diagonal length of an effective pixel area on the imaging plane S15 satisfies ImgH=3.37 mm, half of a maximum field-of-view angle of the optical imaging lens assembly satisfies HFOV=71.1°, and an aperture number of the optical imaging lens assembly satisfies Fno=2.29.

In Example 1, the object-side surface and the image-side surface of any one of the first lenses E1 to the sixth lens E6 are aspheric surfaces, and the surface type x of each aspheric lens may be defined by, but is not limited to, the following aspheric surface formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S12 in example 1.

TABLE 2

| Surface No. | A4 | A6 | A8 | A10 | A12 |
|---|---|---|---|---|---|
| S1 | 2.9778E−01 | −3.3869E−01 | 2.8282E−01 | −1.6550E−01 | 6.7122E−02 |
| S2 | 7.9614E−01 | −1.6992E+00 | 4.4946E+00 | −1.0564E+01 | 1.8180E+01 |
| S3 | 3.8950E−02 | −2.4585E−01 | 1.2941E+00 | −3.1844E+00 | 2.5324E+00 |
| S4 | 1.0826E−01 | −4.2339E−01 | 6.4031E+00 | −4.6621E+01 | 2.0988E+02 |
| S5 | 5.5610E−02 | −1.9412E+00 | 3.9733E+01 | −5.1111E+02 | 3.9087E+03 |
| S6 | −2.0987E−01 | 7.1653E−01 | −6.9972E+00 | 4.9199E+01 | −2.4220E+02 |
| S7 | −8.4987E−01 | 2.6091E+00 | −1.4422E+01 | 6.2511E+01 | −1.9130E+02 |
| S8 | −4.0270E−01 | 5.8511E−01 | −6.6877E−01 | 6.3497E−01 | −8.3348E−01 |
| S9 | −2.2738E−01 | 2.5496E−01 | 1.6647E−01 | −1.0491E+00 | 1.6492E+00 |
| S10 | −4.7977E−01 | 1.4689E+00 | −2.8478E+00 | 3.7900E+00 | −3.3040E+00 |
| S11 | −3.3484E−02 | −2.4059E−01 | 2.8178E−01 | −1.5852E−01 | 5.2510E−02 |
| S12 | −2.2081E−01 | 9.4438E−02 | −2.1991E−02 | 3.3034E−03 | −8.0065E−04 |

| Surface No. | A14 | A16 | A18 | A20 |
|---|---|---|---|---|
| S1 | −1.8373E−02 | 3.2248E−03 | −3.2693E−04 | 1.4534E−05 |
| S2 | −2.0649E+01 | 1.4522E+01 | −5.6813E+00 | 9.3434E−01 |
| S3 | 6.0904E+00 | −1.8558E+01 | 1.8283E+01 | −6.2922E+00 |
| S4 | −5.9172E+02 | 9.9288E+02 | −9.0104E+02 | 3.4106E+02 |
| S5 | −1.8209E+04 | 5.0015E+04 | −7.3501E+04 | 4.3339E+04 |
| S6 | 7.7542E+02 | −1.5404E+03 | 1.7127E+03 | −8.1657E+02 |
| S7 | 3.8442E+02 | −4.7410E+02 | 3.1459E+02 | −7.9727E+01 |
| S8 | 1.3316E+00 | −1.3326E+00 | 6.7837E−01 | −1.3678E−01 |
| S9 | −1.3589E+00 | 6.2940E−01 | −1.5412E−01 | 1.5370E−02 |
| S10 | 1.8527E+00 | −6.4170E−01 | 1.2467E−01 | −1.0384E−02 |
| S11 | −1.0968E−02 | 1.4531E−03 | −1.1320E−04 | 3.9607E−06 |
| S12 | 2.3768E−04 | −4.0923E−05 | 3.4847E−06 | −1.1626E−07 |

Figure 2A:
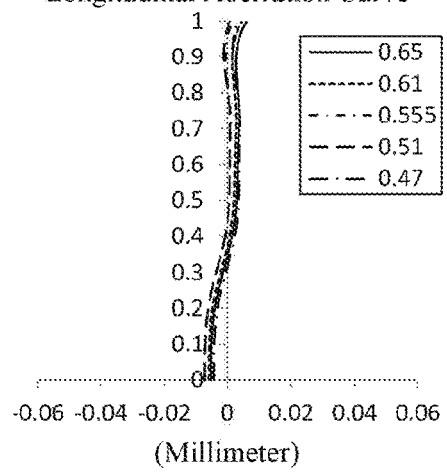
FIGS. 2A to 2D show a longitudinal aberration curve, an astigmatic curve, a distortion curve and a lateral color curve, respectively, of the optical imaging lens assembly of Example 1.
Figure 2B:
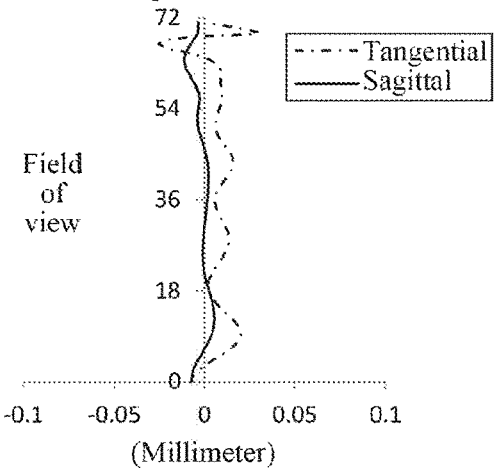
Figure 2C:
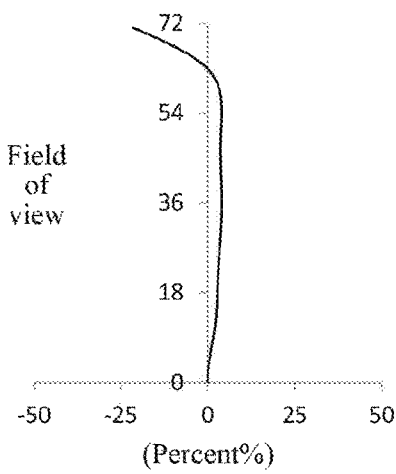
Figure 2D:
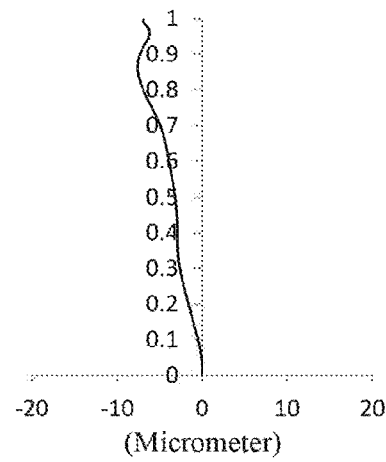

FIG. 2A illustrates a longitudinal aberration curve of the optical imaging lens assembly according to example 1, representing deviations of focal points converged by light of different wavelengths after passing through the optical imaging lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion at different field-of-view angles. FIG. 2D illustrates a lateral color curve of the optical imaging lens assembly according to example 1, representing deviations of different image heights on an imaging plane after light passes through the optical imaging lens assembly. As can be seen from FIGS. 2A to 2D, the optical imaging lens assembly according to Example 1 can achieve good imaging quality.

Example 2

Figure 3:
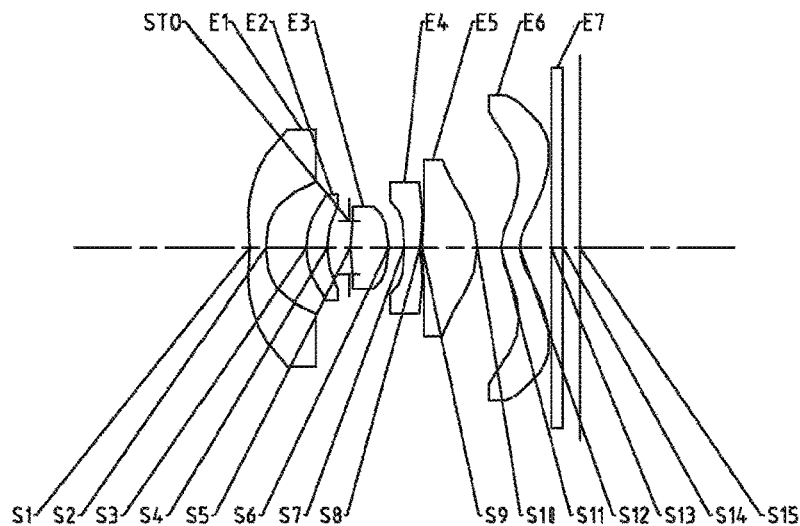
FIG. 3 shows a schematic structural diagram of an optical imaging lens assembly according to Example 2 of the present disclosure.

An optical imaging lens assembly according to Example 2 of the present disclosure is described below with reference to FIGS. 3 to 4D. FIG. 3 shows a schematic structural diagram of an optical imaging lens assembly according to Example 2 of the present disclosure.

As shown in FIG. 3, the optical imaging lens assembly includes a first lens E1, a second lens E2, a stop STO, a third lens E3, a fourth lens E4, a fifth lens E5, a sixth lens E6, a filter E7, and an imaging plane S15, which are sequentially arranged from an object side to an image side along an optical axis.

The first lens E1 has a negative refractive power, an object-side surface S1 thereof is a concave surface and an image-side surface S2 thereof is a concave surface. The second lens E2 has a positive refractive power, an object-side surface S3 thereof is a convex surface and an image-side surface S4 thereof is a concave surface. The third lens E3 has a positive refractive power, an object-side surface S5 thereof is a convex surface and an image-side surface S6 thereof is a convex surface. The fourth lens E4 has a negative refractive power, an object-side surface S7 thereof is a convex surface and an image-side surface S8 thereof is a concave surface. The fifth lens E5 has a positive refractive power, an object-side surface S9 thereof is a convex surface and an image-side surface S10 thereof is a convex surface. The sixth lens E6 has a positive refractive power, an object-side surface S11 thereof is a convex surface and an image-side surface S12 thereof is a concave surface. The filter E7 has an object-side surface S13 and an image-side surface S14. Light from the object sequentially passes through the respective surfaces S1 to S14 and is finally imaged on the imaging plane S15.

In the present example, a total effective focal length of the optical imaging lens assembly satisfies f=1.53 mm, a distance from the object-side surface S1 of the first lens E1 to the imaging plane S15 along the optical axis satisfies TTL=5.80 mm, half of a diagonal length of an effective pixel area on the imaging plane S15 satisfies ImgH=3.37 mm, half of a maximum field-of-view angle of the optical imaging lens assembly satisfies HFOV=69.5°, and an aperture number of the optical imaging lens assembly satisfies Fno=2.29.

Table 3 shows a basic parameter table of the optical imaging lens assembly of Example 2, wherein the radius of curvature, the thickness and the focal length are all in units of millimeters (mm).

TABLE 3

| Surface No. | Surface type | Radius of curvature | Thickness/ Distance | Material Refractive index | Abbe number | Focal length | Conic coefficient |
|---|---|---|---|---|---|---|---|
| OBJ | Spherical | Infinity | Infinity | | | | |
| S1 | Aspheric | −2.2246 | 0.2863 | 1.55 | 56.11 | −2.38 | −55.8762 |
| S2 | Aspheric | 3.2791 | 0.7128 | | | | 6.6783 |
| S3 | Aspheric | 1.4514 | 0.3674 | 1.68 | 19.25 | 6.93 | 0.2541 |
| S4 | Aspheric | 1.8859 | 0.3848 | | | | 1.2999 |
| STO | Spherical | Infinity | 0.0214 | | | | |
| S5 | Aspheric | 2.9187 | 0.6766 | 1.55 | 56.11 | 2.17 | −6.7821 |
| S6 | Aspheric | −1.8333 | 0.2722 | | | | 3.1212 |
| S7 | Aspheric | 62.4135 | 0.2800 | 1.68 | 19.25 | −2.16 | −99.0000 |
| S8 | Aspheric | 1.4251 | 0.0415 | | | | −29.6034 |
| S9 | Aspheric | 2.0437 | 0.9676 | 1.55 | 56.11 | 1.94 | −75.8321 |
| S10 | Aspheric | −1.8311 | 0.4065 | | | | −0.0293 |
| S11 | Aspheric | 0.7164 | 0.3316 | 1.55 | 56.11 | 19.27 | −3.3659 |
| S12 | Aspheric | 0.6430 | 0.5544 | | | | −2.0219 |
| S13 | Spherical | Infinity | 0.2100 | 1.52 | 64.17 | | |
| S14 | Spherical | Infinity | 0.2918 | | | | |
| S15 | Spherical | Infinity | | | | | |

In Example 2, the object-side surface and the image-side surface of any one of the first lenses E1 to the sixth lens E6 are aspheric surfaces. Table 4 below shows the high-order coefficients A4, A6, A8, A10, A12, A14, A16, A18 and A20 that can be applicable to each aspheric surface S1-S12 in Example 2.

TABLE 4

| Surface No. | A4 | A6 | A8 | A10 | A12 |
|---|---|---|---|---|---|
| S1 | 2.8427E−01 | −3.1369E−01 | 2.5390E−01 | −1.4370E−01 | 5.6152E−02 |
| S2 | 7.9651E−01 | −1.7030E+00 | 4.3513E+00 | −9.7505E+00 | 1.6092E+01 |
| S3 | 3.7005E−02 | −1.6365E−01 | 5.4895E−01 | 6.8048E−02 | −5.6819E+00 |
| S4 | 1.1331E−01 | −5.1117E−01 | 6.9186E+00 | −4.8242E+01 | 2.0802E+02 |
| S5 | 6.0861E−02 | −2.6998E−01 | 5.4134E+01 | −6.6827E+02 | 5.0020E+03 |
| S6 | −2.3174E−01 | 5.4924E−01 | −4.2936E+00 | 2.3055E+01 | −9.2334E+01 |
| S7 | −8.6743E−01 | 2.4240E+00 | −1.1832E+01 | 4.6993E+01 | −1.3790E+02 |
| S8 | −4.1779E−01 | 9.0977E−01 | −2.2221E+00 | 4.4914E+00 | −6.5170E+00 |
| S9 | −2.3920E−01 | 4.8196E−01 | −7.5190E−01 | 9.5862E−01 | −9.6979E−01 |
| S10 | −4.0394E−01 | 1.1638E+00 | −2.1826E+00 | 2.8673E+00 | −2.4884E+00 |
| S11 | −7.7883E−02 | −1.7878E−01 | 2.3451E−01 | −1.3345E−01 | 4.3019E−02 |
| S12 | −2.4670E−01 | 1.3865E−01 | −6.1375E−02 | 2.5462E−02 | −8.6889E−03 |

| Surface No. | A14 | A16 | A18 | A20 |
|---|---|---|---|---|
| S1 | −1.4741E−02 | 2.4703E−03 | −2.3803E−04 | 1.0014E−05 |
| S2 | −1.7677E+01 | 1.2086E+01 | −4.6114E+00 | 7.4153E−01 |
| S3 | 1.8052E+01 | −2.7059E+01 | 1.9813E+01 | −5.6423E+00 |
| S4 | −5.5700E+02 | 8.8536E+02 | −7.6255E+02 | 2.7453E+02 |
| S5 | −2.3181E+04 | 6.4764E+04 | −9.9874E+04 | 6.5108E+04 |
| S6 | 2.4976E+02 | −4.3568E+02 | 4.3856E+02 | −1.9505E+02 |
| S7 | 2.7452E+02 | −3.4674E+02 | 2.4744E+02 | −7.4880E+01 |

TABLE 4-continued

| | | | | |
|---|---|---|---|---|
| S8 | 6.4470E+00 | −4.0869E+00 | 1.4870E+00 | −2.3462E−01 |
| S9 | 7.3817E−01 | −3.8038E−01 | 1.1366E−01 | −1.4563E−02 |
| S10 | 1.3863E+00 | −4.7320E−01 | 8.9637E−02 | −7.1986E−03 |
| S11 | −8.4224E−03 | 1.0006E−03 | −6.6678E−05 | 1.9108E−06 |
| S12 | 1.9975E−03 | −2.7891E−04 | 2.1302E−05 | −6.8238E−07 |

Figures 4A, 4B:
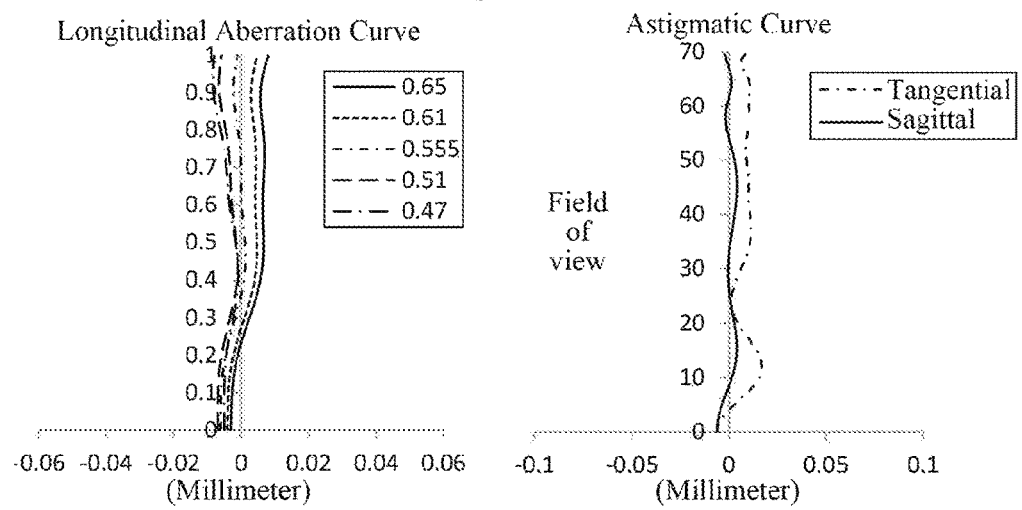
FIGS. 4A to 4D show a longitudinal aberration curve, an astigmatic curve, a distortion curve and a lateral color curve, respectively, of the optical imaging lens assembly of Example 2.
Figures 4C, 4D:
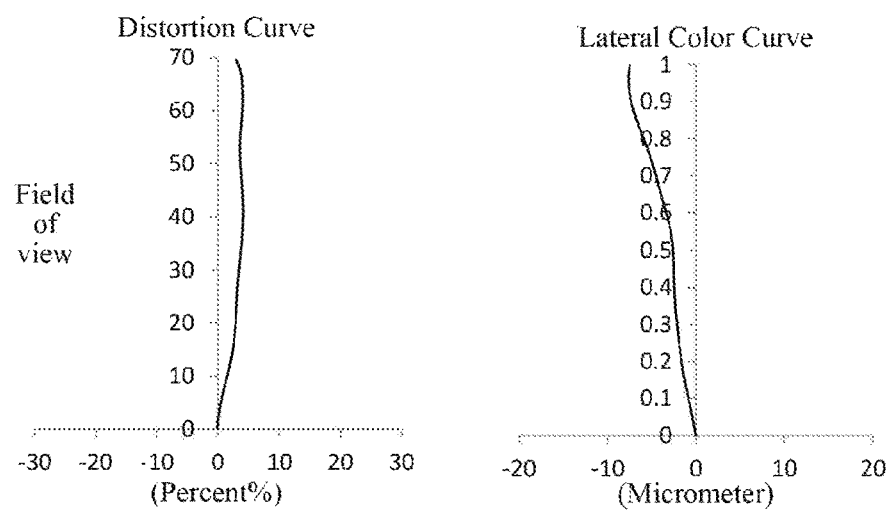

FIG. 4A illustrates a longitudinal aberration curve of the optical imaging lens assembly according to example 2, representing deviations of focal points converged by light of different wavelengths after passing through the optical imaging lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion at different field-of-view angles. FIG. 4D illustrates a lateral color curve of the optical imaging lens assembly according to example 2, representing deviations of different image heights on an imaging plane after light passes through the optical imaging lens assembly. As can be seen from FIGS. 4A to 4D, the optical imaging lens assembly according to Example 2 can achieve good imaging quality.

Example 3

An optical imaging lens assembly according to Example 3 of the present disclosure is described below with reference to FIGS. 5 to 6D. FIG. 5 shows a schematic structural diagram of an optical imaging lens assembly according to Example 3 of the present disclosure.

As shown in FIG. 5, the optical imaging lens assembly includes a first lens E1, a second lens E2, a stop STO, a third lens E3, a fourth lens E4, a fifth lens E5, a sixth lens E6, a filter E7, and an imaging plane S15, which are sequentially arranged from an object side to an image side along an optical axis.

The first lens E1 has a negative refractive power, an object-side surface S1 thereof is a concave surface and an image-side surface S2 thereof is a concave surface. The second lens E2 has a negative refractive power, an object-side surface S3 thereof is a convex surface and an image-side surface S4 thereof is a concave surface. The third lens E3 has a positive refractive power, an object-side surface S5 thereof is a convex surface and an image-side surface S6 thereof is a convex surface. The fourth lens E4 has a negative refractive power, an object-side surface S7 thereof is a concave surface and an image-side surface S8 thereof is a concave surface. The fifth lens E5 has a positive refractive power, an object-side surface S9 thereof is a convex surface and an image-side surface S10 thereof is a convex surface. The sixth lens E6 has a positive refractive power, an object-side surface S11 thereof is a convex surface and an image-side surface S12 thereof is a concave surface. The filter E7 has an object-side surface S13 and an image-side surface S14. Light from the object sequentially passes through the respective surfaces S1 to S14 and is finally imaged on the imaging plane S15.

In the present example, a total effective focal length of the optical imaging lens assembly satisfies f=1.30 mm, a distance from the object-side surface S1 of the first lens E1 to the imaging plane S15 along the optical axis satisfies TTL=6.20 mm, half of a diagonal length of an effective pixel area on the imaging plane S15 satisfies ImgH=3.37 mm, half of a maximum field-of-view angle of the optical imaging lens assembly satisfies HFOV=68.7°, and an aperture number of the optical imaging lens assembly satisfies Fno=2.29.

Table 5 shows a basic parameter table of the optical imaging lens assembly of Example 3, wherein the radius of curvature, the thickness and the focal length are all in units of millimeters (mm).

TABLE 5

| | | | | Material | | | |
|---|---|---|---|---|---|---|---|
| Surface No. | Surface type | Radius of curvature | Thickness/ Distance | Refractive index | Abbe number | Focal length | Conic coefficient |
| OBJ | Spherical | Infinity | Infinity | | | | |
| S1 | Aspheric | −2.2413 | 0.3848 | 1.55 | 56.11 | −2.37 | −56.9865 |
| S2 | Aspheric | 3.2436 | 0.7655 | | | | 6.7255 |
| S3 | Aspheric | 1.7573 | 0.4218 | 1.68 | 19.25 | −100.03 | 0.4512 |
| S4 | Aspheric | 1.5469 | 0.5502 | | | | 0.3641 |
| STO | Spherical | Infinity | 0.0100 | | | | |
| S5 | Aspheric | 2.0069 | 0.7773 | 1.55 | 56.11 | 1.75 | −5.5892 |
| S6 | Aspheric | −1.5685 | 0.2836 | | | | 2.7577 |
| S7 | Aspheric | −22.7897 | 0.2280 | 1.68 | 19.25 | −1.72 | 99.0000 |
| S8 | Aspheric | 1.2335 | 0.0461 | | | | −28.3170 |
| S9 | Aspheric | 1.7701 | 0.7835 | 1.55 | 56.11 | 1.69 | −93.2371 |
| S10 | Aspheric | −1.6265 | 0.7170 | | | | −0.1644 |
| S11 | Aspheric | 0.5879 | 0.2561 | 1.55 | 56.11 | 15.80 | −2.4354 |
| S12 | Aspheric | 0.5338 | 0.5916 | | | | −2.2034 |
| S13 | Spherical | Infinity | 0.2100 | 1.52 | 64.17 | | |
| S14 | Spherical | Infinity | 0.1745 | | | | |
| S15 | Spherical | Infinity | | | | | |

In Example 3, the object-side surface and the image-side surface of any one of the first lenses E1 to the sixth lens E6 are aspheric surfaces. Table 6 below shows the high-order coefficients A4, A6, A8, A10, A12, A14, A16, A18 and A20 that can be applicable to each aspheric surface S1-S12 in Example 3.

TABLE 6

| Surface No. | A4 | A6 | A8 | A10 | A12 |
|---|---|---|---|---|---|
| S1 | 2.0847E−01 | −1.8561E−01 | 1.2533E−01 | −5.9258E−02 | 1.9277E−02 |
| S2 | 7.047E−01 | −1.2129E+00 | 2.1778E+00 | −2.4837E+00 | 3.4027E−01 |
| S3 | 1.4024E−01 | −8.7697E−01 | 4.6600E+00 | −1.5340E+01 | 3.1717E+01 |
| S4 | 3.2993E−02 | 1.3629E+00 | −1.2033E+01 | 6.0265E+01 | −1.8209E+02 |
| S5 | 5.0645E−02 | −1.0805E+00 | 1.9378E+01 | −2.3448E+02 | 1.6420E+03 |
| S6 | −1.9730E−01 | 1.1599E+00 | −1.2481E+01 | 8.4548E+01 | −3.6132E+02 |
| S7 | −1.0479E+00 | 2.1163E+00 | −8.1912E+00 | 3.8270E+01 | −1.6456E+02 |
| S8 | −3.8487E−01 | 3.4032E−01 | 7.4632E−01 | −3.0345E+00 | 4.5215E+00 |
| S9 | −1.6653E−01 | −2.0110E−01 | 2.0240E+00 | −5.2244E+00 | 7.3835E+00 |
| S10 | −4.0293E−01 | 1.2501E+00 | −2.9040E+00 | 4.6926E+00 | −5.0128E+00 |
| S11 | −1.3034E−01 | −6.5319E−02 | 1.1174E−01 | −6.2691E−02 | 1.9376E−02 |
| S12 | −1.9860E−01 | 8.0176E−02 | −1.5028E−02 | 1.6685E−04 | 2.9975E−04 |

| Surface No. | A14 | A16 | A18 | A20 |
|---|---|---|---|---|
| S1 | −4.1955E−03 | 5.8038E−04 | −4.5978E−05 | 1.5860E−06 |
| S2 | 3.9049E+00 | −5.8594E+00 | 3.6465E+00 | −8.6453E−01 |
| S3 | −4.1001E+01 | 3.1841E+01 | −1.3613E+01 | 2.4760E+00 |
| S4 | 3.2926E+02 | −3.4612E+02 | 1.9024E+02 | −3.9494E+01 |
| S5 | −6.9075E+03 | 1.6684E+04 | −2.0479E+04 | 8.6872E+03 |
| S6 | 9.6122E+02 | −1.5537E+03 | 1.3983E+03 | −5.3900E+02 |
| S7 | 4.6559E+02 | −7.8019E+02 | 6.9492E+02 | −2.5028E+02 |
| S8 | −3.3081E+00 | 9.2682E−01 | 1.6563E−01 | −1.0852E−01 |
| S9 | −6.3033E+00 | 3.2402E+00 | −9.2421E−01 | 1.1241E−01 |
| S10 | 3.4793E+00 | −1.4863E+00 | 3.5107E−01 | −3.4894E−02 |
| S11 | −3.6134E−03 | 4.0455E−04 | −2.4849E−05 | 6.3263E−07 |
| S12 | −1.2873E−05 | −6.4511E−06 | 9.0771E−07 | −3.6830E−08 |

FIG. 6A illustrates a longitudinal aberration curve of the optical imaging lens assembly according to example 3, representing deviations of focal points converged by light of different wavelengths after passing through the optical imaging lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion at different field-of-view angles. FIG. 6D illustrates a lateral color curve of the optical imaging lens assembly according to example 3, representing deviations of different image heights on an imaging plane after light passes through the optical imaging lens assembly. As can be seen from FIGS. 6A to 6D, the optical imaging lens assembly according to Example 3 can achieve good imaging quality.

Example 4

Figure 7:
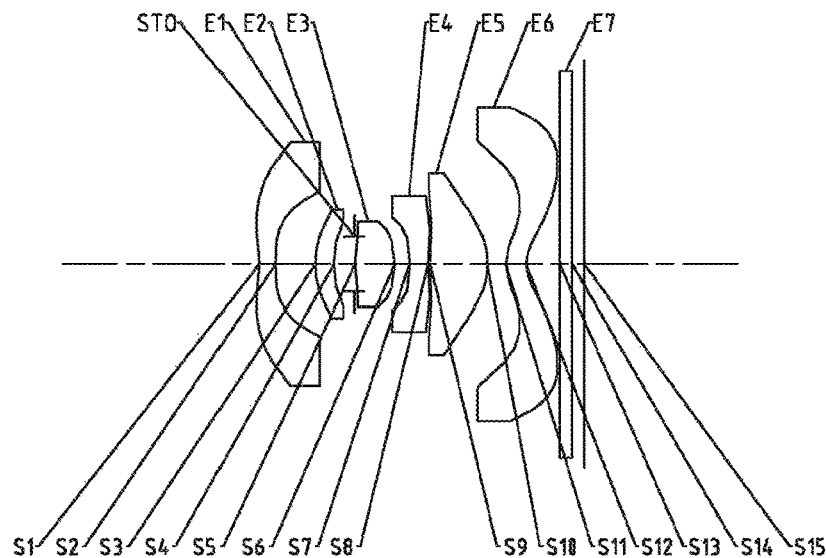
FIG. 7 shows a schematic structural diagram of an optical imaging lens assembly according to Example 4 of the present disclosure.

An optical imaging lens assembly according to Example 4 of the present disclosure is described below with reference to FIGS. 7 to 8D. FIG. 7 shows a schematic structural diagram of an optical imaging lens assembly according to Example 4 of the present disclosure.

As shown in FIG. 7, the optical imaging lens assembly includes a first lens E1, a second lens E2, a stop STO, a third lens E3, a fourth lens E4, a fifth lens E5, a sixth lens E6, a filter E7, and an imaging plane S15, which are sequentially arranged from an object side to an image side along an optical axis.

The first lens E1 has a negative refractive power, an object-side surface S1 thereof is a concave surface and an image-side surface S2 thereof is a convex surface. The second lens E2 has a positive refractive power, an object-side surface S3 thereof is a convex surface and an image-side surface S4 thereof is a concave surface. The third lens E3 has a positive refractive power, an object-side surface S5 thereof is a convex surface and an image-side surface S6 thereof is a convex surface. The fourth lens E4 has a negative refractive power, an object-side surface S7 thereof is a concave surface and an image-side surface S8 thereof is a concave surface. The fifth lens E5 has a positive refractive power, an object-side surface S9 thereof is a convex surface and an image-side surface S10 thereof is a convex surface. The sixth lens E6 has a positive refractive power, an object-side surface S11 thereof is a convex surface and an image-side surface S12 thereof is a concave surface. The filter E7 has an object-side surface S13 and an image-side surface S14. Light from the object sequentially passes through the respective surfaces S1 to S14 and is finally imaged on the imaging plane S15.

In the present example, a total effective focal length of the optical imaging lens assembly satisfies f=1.57 mm, a distance from the object-side surface S1 of the first lens E1 to the imaging plane S15 along the optical axis satisfies TTL=5.51 mm, half of a diagonal length of an effective pixel area on the imaging plane S15 satisfies ImgH=3.37 mm, half of a maximum field-of-view angle of the optical imaging lens assembly satisfies HFOV=69.3°, and an aperture number of the optical imaging lens assembly satisfies Fno=2.29.

Table 7 shows a basic parameter table of the optical imaging lens assembly of Example 4, wherein the radius of curvature, the thickness and the focal length are all in units of millimeters (mm).

TABLE 7

| Surface No. | Surface type | Radius of curvature | Thickness/ Distance | Material Refractive index | Abbe number | Focal length | Conic coefficient |
|---|---|---|---|---|---|---|---|
| OBJ | Spherical | Infinity | Infinity | | | | |
| S1 | Aspheric | −1.5431 | 0.2775 | 1.55 | 56.11 | −2.87 | −20.9643 |
| S2 | Aspheric | −100.0000 | 0.6733 | | | | −99.0000 |
| S3 | Aspheric | 1.6054 | 0.3182 | 1.68 | 19.25 | 7.71 | 0.1970 |
| S4 | Aspheric | 2.1317 | 0.3497 | | | | 1.2039 |
| STO | Spherical | Infinity | 0.0100 | | | | |
| S5 | Aspheric | 2.6398 | 0.6734 | 1.55 | 56.11 | 1.94 | −5.0006 |
| S6 | Aspheric | −1.6132 | 0.2485 | | | | 2.9811 |
| S7 | Aspheric | −5.0376 | 0.3168 | 1.68 | 19.25 | −2.14 | 38.1105 |
| S8 | Aspheric | 2.0890 | 0.0376 | | | | −35.5848 |
| S9 | Aspheric | 3.5055 | 0.9711 | 1.55 | 56.11 | 2.16 | −65.9180 |
| S10 | Aspheric | −1.6075 | 0.3030 | | | | −0.0481 |
| S11 | Aspheric | 0.6854 | 0.3453 | 1.55 | 56.11 | 42.31 | −3.8018 |
| S12 | Aspheric | 0.5807 | 0.5709 | | | | −2.0398 |
| S13 | Spherical | Infinity | 0.2100 | 1.52 | 64.17 | | |
| S14 | Spherical | Infinity | 0.2067 | | | | |
| S15 | Spherical | Infinity | | | | | |

In Example 4, the object-side surface and the image-side surface of any one of the first lenses E1 to the sixth lens E6 are aspheric surfaces. Table 8 below shows the high-order coefficients A4, A6, A8, A10, A12, A14, A16, A18 and A20 that can be applicable to each aspheric surface S1-S12 in Example 4.

TABLE 8

| Surface No. | A4 | A6 | A8 | A10 | A12 |
|---|---|---|---|---|---|
| S1 | 3.0150E−01 | −3.3779E−01 | 2.8184E−01 | −1.6462E−01 | 6.6552E−02 |
| S2 | 8.5581E−01 | −1.5324E+00 | 3.3084E+00 | −6.7188E+00 | 1.0744E+01 |
| S3 | 4.4091E−02 | −1.5959E−01 | 2.7287E−01 | 1.9492E+00 | −1.1650E+01 |
| S4 | 1.1884E−01 | −5.8665E−01 | 6.7447E+00 | −3.9979E+01 | 1.5133E+02 |
| S5 | 6.2159E−02 | −2.4234E+00 | 5.3626E+01 | −7.3038E+02 | 5.9807E+03 |
| S6 | −2.0490E−01 | 6.8431E−01 | −6.9301E+00 | 4.9364E+01 | −2.3975E+02 |
| S7 | −7.8655E−01 | 1.9831E+00 | −9.5774E+00 | 3.4633E+01 | −8.2868E+01 |
| S8 | −4.1433E−01 | 6.6282E−01 | −1.0205E+00 | 1.5213E+00 | −2.0512E+00 |
| S9 | −2.3833E−01 | 3.0980E−01 | −4.1334E−02 | −5.3632E−01 | 8.7542E−01 |
| S10 | −4.9535E−01 | 1.5871E+00 | −3.2235E+00 | 4.4822E+00 | −4.0767E+00 |
| S11 | −9.0017E−02 | −2.9361E−01 | 4.0251E−01 | −2.5007E−01 | 8.9313E−02 |
| S12 | −2.7028E−01 | 1.4987E−01 | −4.7787E−02 | 8.1160E−03 | −2.3434E−04 |

| Surface No. | A14 | A16 | A18 | A20 |
|---|---|---|---|---|
| S1 | −1.8144E−02 | 3.1711E−03 | −3.2026E−04 | 1.4196E−05 |
| S2 | −1.1707E+01 | 8.0033E+00 | −3.0645E+00 | 4.9622E−01 |
| S3 | 2.9121E+01 | −4.0376E+01 | 2.9322E+01 | −8.5688E+00 |
| S4 | −3.7056E+02 | 5.5159E+02 | −4.4986E+02 | 1.5508E+02 |
| S5 | −3.0174E+04 | 9.1432E+04 | −1.5244E+05 | 1.0709E+05 |
| S6 | 7.4623E+02 | −1.4317E+03 | 1.5363E+03 | −7.0846E+02 |
| S7 | 1.1384E+02 | −6.4262E+01 | −2.6053E+01 | 3.8975E+01 |
| S8 | 2.2163E+00 | −1.6238E+00 | 6.8907E−01 | −1.2600E−01 |
| S9 | −6.5120E−01 | 2.4442E−01 | −3.9126E−02 | 8.0958E−04 |
| S10 | 2.3742E+00 | −8.4863E−01 | 1.6903E−01 | −1.4349E−02 |
| S11 | −1.9813E−02 | 2.7788E−03 | −2.3122E−04 | 8.7541E−06 |
| S12 | −2.1871E−04 | 5.0024E−05 | −4.7881E−06 | 1.7810E−07 |

Figure 8A:
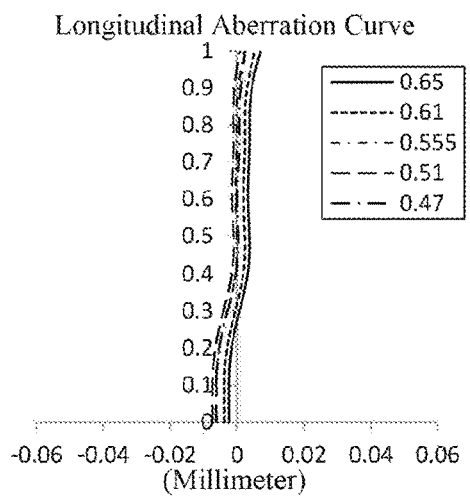
FIGS. 8A to 8D show a longitudinal aberration curve, an astigmatic curve, a distortion curve and a lateral color curve, respectively, of the optical imaging lens assembly of Example 4.
Figure 8B:
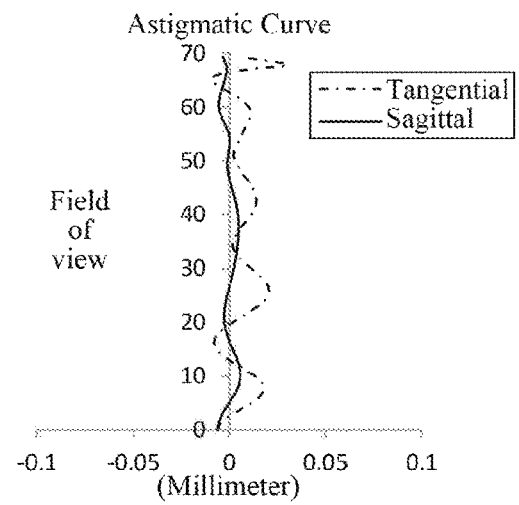
Figure 8C:
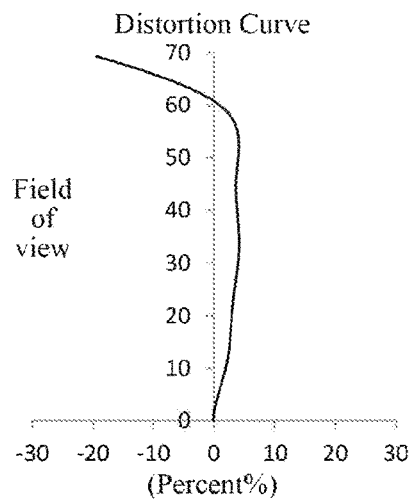
Figure 8D:
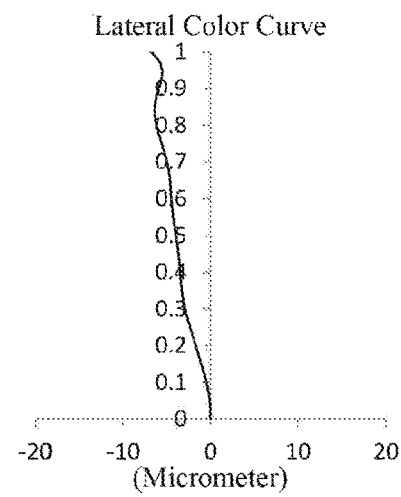

FIG. 8A illustrates a longitudinal aberration curve of the optical imaging lens assembly according to example 4, representing deviations of focal points converged by light of different wavelengths after passing through the optical imaging lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion at different field-of-view angles. FIG. 8D illustrates a lateral color curve of the optical imaging lens assembly according to example 4, representing deviations of different image heights on an imaging plane after light passes through the optical imaging lens assembly. As can be seen from FIGS. 8A to 8D, the optical imaging lens assembly according to Example 4 can achieve good imaging quality.

Example 5

Figure 9:
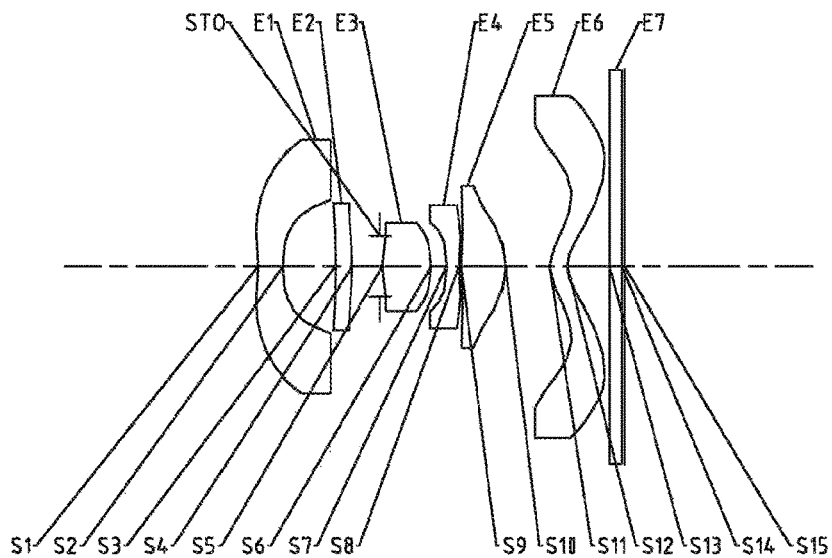
FIG. 9 shows a schematic structural diagram of an optical imaging lens assembly according to Example 5 of the present disclosure.

An optical imaging lens assembly according to Example 5 of the present disclosure is described below with reference to FIGS. 9 to 10D. FIG. 9 shows a schematic structural diagram of an optical imaging lens assembly according to Example 5 of the present disclosure.

As shown in FIG. 9, the optical imaging lens assembly includes a first lens E1, a second lens E2, a stop STO, a third lens E3, a fourth lens E4, a fifth lens E5, a sixth lens E6, a filter E7, and an imaging plane S15, which are sequentially arranged from an object side to an image side along an optical axis.

The first lens E1 has a negative refractive power, an object-side surface S1 thereof is a concave surface and an image-side surface S2 thereof is a concave surface. The second lens E2 has a positive refractive power, an object-side surface S3 thereof is a concave surface and an image-side surface S4 thereof is a convex surface. The third lens E3 has a positive refractive power, an object-side surface S5 thereof is a convex surface and an image-side surface S6 thereof is a convex surface. The fourth lens E4 has a negative refractive power, an object-side surface S7 thereof is a concave surface and an image-side surface S8 thereof is a concave surface. The fifth lens E5 has a positive refractive power, an object-side surface S9 thereof is a convex surface and an image-side surface S10 thereof is a convex surface. The sixth lens E6 has a positive refractive power, an object-side surface S11 thereof is a convex surface and an image-side surface S12 thereof is a concave surface. The filter E7 has an object-side surface S13 and an image-side surface S14. Light from the object sequentially passes through the respective surfaces S1 to S14 and is finally imaged on the imaging plane S15.

In the present example, a total effective focal length of the optical imaging lens assembly satisfies f=1.49 mm, a distance from the object-side surface S1 of the first lens E1 to the imaging plane S15 along the optical axis satisfies TTL=6.20 mm, half of a diagonal length of an effective pixel area on the imaging plane S15 satisfies ImgH=3.37 mm, half of a maximum field-of-view angle of the optical imaging lens assembly satisfies HFOV=66.6°, and an aperture number of the optical imaging lens assembly satisfies Fno=2.30.

Table 9 shows a basic parameter table of the optical imaging lens assembly of Example 5, wherein the radius of curvature, the thickness and the focal length are all in units of millimeters (mm).

TABLE 9

| Surface No. | Surface type | Radius of curvature | Thickness/ Distance | Refractive index | Abbe number | Focal length | Conic coefficient |
|---|---|---|---|---|---|---|---|
| OBJ | Spherical | Infinity | Infinity | | | | |
| S1 | Aspheric | −2.4978 | 0.4254 | 1.55 | 56.11 | −2.82 | −28.8419 |
| S2 | Aspheric | 4.2552 | 0.8870 | | | | 9.1469 |
| S3 | Aspheric | −50.2403 | 0.2852 | 1.68 | 19.25 | 12.57 | −99.0000 |
| S4 | Aspheric | −7.2998 | 0.4700 | | | | 50.4661 |
| STO | Spherical | Infinity | 0.0367 | | | | |
| S5 | Aspheric | 2.3705 | 0.8291 | 1.55 | 56.11 | 2.06 | −0.3325 |
| S6 | Aspheric | −1.8815 | 0.2613 | | | | 3.0066 |
| S7 | Aspheric | −5.6846 | 0.2100 | 1.68 | 19.25 | −1.84 | 32.9551 |
| S8 | Aspheric | 1.6255 | 0.0371 | | | | −33.6039 |
| S9 | Aspheric | 2.4356 | 0.7422 | 1.55 | 56.11 | 1.96 | −99.0000 |
| S10 | Aspheric | −1.6978 | 0.7484 | | | | 0.0858 |
| S11 | Aspheric | 0.6638 | 0.2989 | 1.55 | 56.11 | 27.86 | −2.2874 |
| S12 | Aspheric | 0.5837 | 0.7133 | | | | −1.9254 |
| S13 | Spherical | Infinity | 0.2100 | 1.52 | 64.17 | | |
| S14 | Spherical | Infinity | 0.0451 | | | | |
| S15 | Spherical | Infinity | | | | | |

In Example 5, the object-side surface and the image-side surface of any one of the first lenses E1 to the sixth lens E6 are aspheric surfaces. Table 10 below shows the high-order coefficients A4, A6, A8, A10, A12, A14, A16, A18 and A20 that can be applicable to each aspheric surface S1-S12 in Example 5.

TABLE 10

| Surface No. | A4 | A6 | A8 | A10 | A12 |
|---|---|---|---|---|---|
| S1 | 2.6776E−01 | −2.7172E−01 | 2.0851E−01 | −1.1297E−0 | 4.2399E−02 |
| S2 | 5.2503E−01 | −3.4264E−01 | 7.5457E−02 | −3.8749E−01 | 2.2809E+00 |
| S3 | 3.5466E−02 | −1.9718E−01 | 7.5275E−01 | −1.6780E+00 | 2.0649E+00 |
| S4 | 7.4106E−02 | −2.6304E−01 | 1.7061E+00 | −6.6710E+00 | 1.5623E+01 |
| S5 | 5.9616E−02 | −2.0183E+00 | 3.7093E+01 | −4.1283E+02 | 2.7899E+03 |
| S6 | −1.9749E−01 | 2.5231E−01 | −4.6121E−01 | −9.8103E−01 | 4.1363E+00 |
| S7 | −1.0373E+00 | 1.8806E+00 | −3.9162E+00 | 3.6528E+00 | 2.2678E+00 |
| S8 | −6.2142E−01 | 1.9416E+00 | −5.3233E+00 | 1.0550E+01 | −1.4055E+01 |
| S9 | −3.0099E−01 | 1.3063E+00 | −3.9997E+00 | 7.8637E+00 | −1.0026E+01 |
| S10 | −3.1983E−01 | 9.4190E−01 | −2.0287E+00 | 3.3945E+00 | −3.9898E+00 |
| S11 | −1.4537E−01 | −1.2710E−01 | 2.1300E−01 | −1.3782E−01 | 4.9602E−02 |
| S12 | −2.4371E−01 | 1.3958E−01 | −5.3528E−02 | 1.5299E−02 | −3.4859E−03 |

TABLE 10-continued

| Surface No. | A14 | A16 | A18 | A20 |
|---|---|---|---|---|
| S1 | −1.0714E−02 | 1.7336E−03 | −1.6204E−04 | 6.6650E−06 |
| S2 | −4.1384E+00 | 3.6341E+00 | −1.5602E+00 | 2.5887E−01 |
| S3 | −1.4487E+00 | 5.2833E−01 | −5.8102E−02 | −1.0699E−02 |
| S4 | −2.2894E+01 | 2.0801E+01 | −1.0749E+01 | 2.4278E+00 |
| S5 | −1.1712E+04 | 2.9761E+04 | −4.1933E+04 | 2.5089E+04 |
| S6 | −9.9708E+00 | 1.5302E+01 | −1.1624E+01 | 2.0645E+00 |
| S7 | −2.3512E+01 | −4.2522E+01 | 9.7683E+01 | −6.0016E+01 |
| S8 | 1.1915E+01 | −6.0490E+00 | 1.6789E+00 | −1.9865E−01 |
| S9 | 8.2133E+00 | −4.1519E+00 | 1.1765E+00 | −1.4289E−01 |
| S10 | 3.0999E+00 | −1.4762E+00 | 3.8562E−01 | −4.2129E−02 |
| S11 | −1.0642E−02 | 1.3544E−03 | −9.4296E−05 | 2.7576E−06 |
| S12 | 5.9418E−04 | −6.6974E−05 | 4.3073E−06 | −1.1821E−07 |

Figures 10A, 10B:
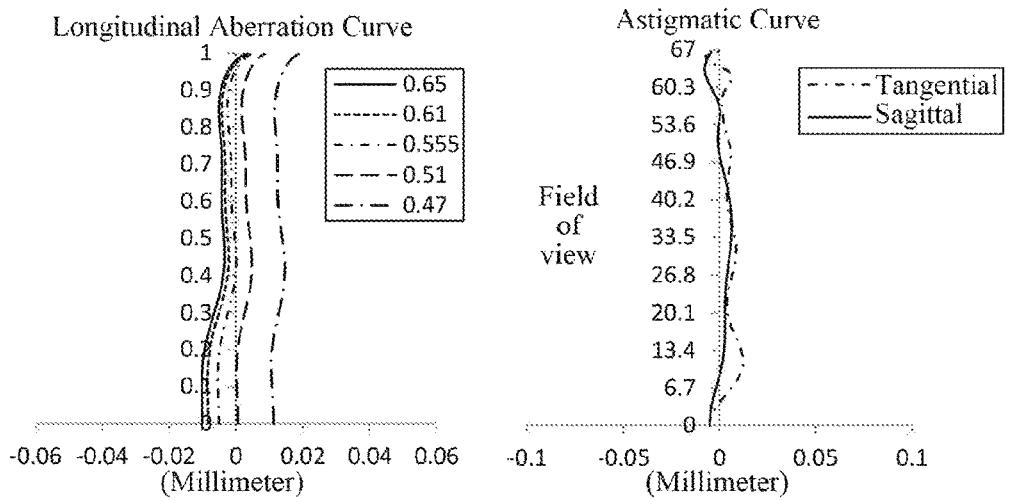
FIGS. 10A to 10D show a longitudinal aberration curve, an astigmatic curve, a distortion curve, and a lateral color curve, respectively, of the optical imaging lens assembly of Example 5.
Figures 10C, 10D:
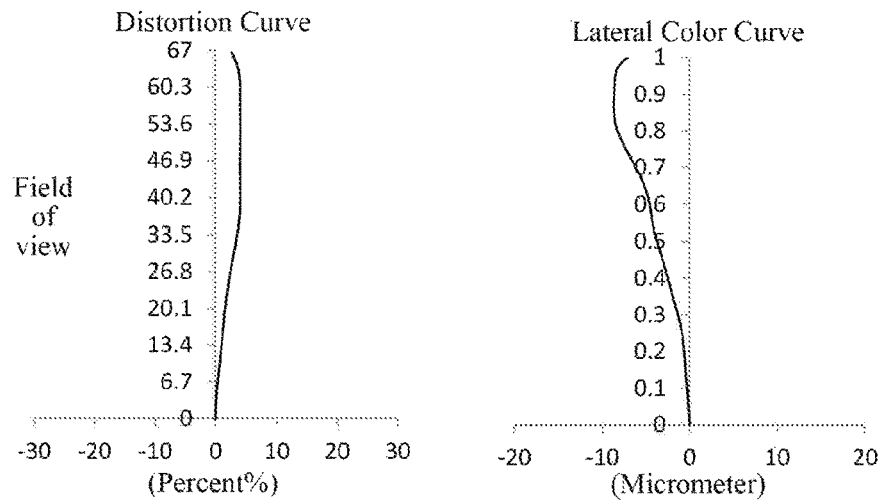

FIG. 10A illustrates a longitudinal aberration curve of the optical imaging lens assembly according to example 5, representing deviations of focal points converged by light of different wavelengths after passing through the optical imaging lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion at different field-of-view angles. FIG. 10D illustrates a lateral color curve of the optical imaging lens assembly according to example 5, representing deviations of different image heights on an imaging plane after light passes through the optical imaging lens assembly. As can be seen from FIGS. 10A to 10D, the optical imaging lens assembly according to Example 5 can achieve good imaging quality.

Example 6

Figure 11:
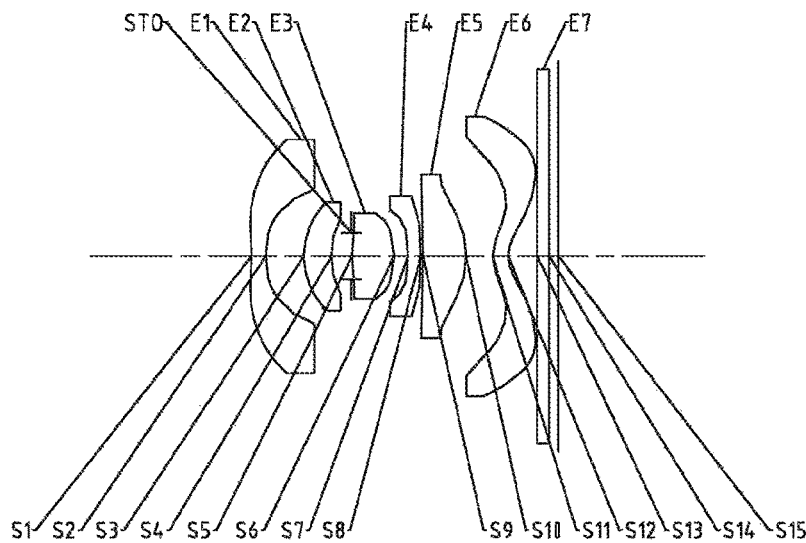
FIG. 11 shows a schematic structural diagram of an optical imaging lens assembly according to Example 6 of the present disclosure.

An optical imaging lens assembly according to Example 6 of the present disclosure is described below with reference to FIGS. 11 to 12D. FIG. 11 shows a schematic structural diagram of an optical imaging lens assembly according to Example 6 of the present disclosure.

As shown in FIG. 11, the optical imaging lens assembly includes a first lens E1, a second lens E2, a stop STO, a third lens E3, a fourth lens E4, a fifth lens E5, a sixth lens E6, a filter E7, and an imaging plane S15, which are sequentially arranged from an object side to an image side along an optical axis.

The first lens E1 has a negative refractive power, an object-side surface S1 thereof is a concave surface and an image-side surface S2 thereof is a concave surface. The second lens E2 has a positive refractive power, an object-side surface S3 thereof is a convex surface and an image-side surface S4 thereof is a concave surface. The third lens E3 has a positive refractive power, an object-side surface S5 thereof is a convex surface and an image-side surface S6 thereof is a convex surface. The fourth lens E4 has a negative refractive power, an object-side surface S7 thereof is a concave surface and an image-side surface S8 thereof is a convex surface. The fifth lens E5 has a positive refractive power, an object-side surface S9 thereof is a convex surface and an image-side surface S10 thereof is a convex surface. The sixth lens E6 has a positive refractive power, an object-side surface S11 thereof is a convex surface and an image-side surface S12 thereof is a concave surface. The filter E7 has an object-side surface S13 and an image-side surface S14. Light from the object sequentially passes through the respective surfaces S1 to S14 and is finally imaged on the imaging plane S15.

In the present example, a total effective focal length of the optical imaging lens assembly satisfies f=1.43 mm, a distance from the object-side surface S1 of the first lens E1 to the imaging plane S15 along the optical axis satisfies TTL=5.33 mm, half of a diagonal length of an effective pixel area on the imaging plane S15 satisfies ImgH=3.37 mm, half of a maximum field-of-view angle of the optical imaging lens assembly satisfies HFOV=66.2°, and an aperture number of the optical imaging lens assembly satisfies Fno=2.40.

Table 11 shows a basic parameter table of the optical imaging lens assembly of Example 6, wherein the radius of curvature, the thickness and the focal length are all in units of millimeters (mm).

TABLE 11

| Surface No. | Surface type | Radius of curvature | Thickness/ Distance | Material Refractive index | Material Abbe number | Focal length | Conic coefficient |
|---|---|---|---|---|---|---|---|
| OBJ | Spherical | Infinity | Infinity | | | | |
| S1 | Aspheric | −2.2119 | 0.2508 | 1.55 | 56.11 | −2.39 | −54.1107 |
| S2 | Aspheric | 3.3240 | 0.6598 | | | | 6.8303 |
| S3 | Aspheric | 1.3837 | 0.4803 | 1.68 | 19.25 | 5.91 | 0.2640 |
| S4 | Aspheric | 1.8171 | 0.3476 | | | | 1.9311 |
| STO | Spherical | Infinity | 0.0100 | | | | |
| S5 | Aspheric | 2.7811 | 0.7325 | 1.55 | 56.11 | 2.09 | −8.4481 |
| S6 | Aspheric | −1.7526 | 0.2421 | | | | 3.3521 |
| S7 | Aspheric | −5.0030 | 0.2212 | 1.68 | 19.25 | −8.22 | 36.5820 |
| S8 | Aspheric | −50.0000 | 0.0380 | | | | 71.4083 |
| S9 | Aspheric | 68.6026 | 0.7495 | 1.55 | 56.11 | 3.39 | 99.0000 |
| S10 | Aspheric | −1.8920 | 0.4517 | | | | −0.1133 |
| S11 | Aspheric | 0.6694 | 0.2734 | 1.55 | 56.11 | 99.73 | −3.4376 |
| S12 | Aspheric | 0.5799 | 0.5020 | | | | −1.8757 |

TABLE 11-continued

| Surface No. | Surface type | Radius of curvature | Thickness/ Distance | Material Refractive index | Abbe number | Focal length | Conic coefficient |
|---|---|---|---|---|---|---|---|
| S13 | Spherical | Infinity | 0.2100 | 1.52 | 64.17 | | |
| S14 | Spherical | Infinity | 0.1596 | | | | |
| S15 | Spherical | Infinity | | | | | |

In Example 6, the object-side surface and the image-side surface of any one of the first lenses E1 to the sixth lens E6 are aspheric surfaces. Table 12 below shows the high-order coefficients A4, A6, A8, A10, A12, A14, A16, A18 and A20 that can be applicable to each aspheric surface S1-S12 in Example 6.

TABLE 12

| Surface No. | A4 | A6 | A8 | A10 | A12 |
|---|---|---|---|---|---|
| S1 | 2.7413E−01 | −2.9728E−01 | 2.3586E−01 | −1.3026E−01 | 4.9579E−02 |
| S2 | 8.5517E−01 | −2.5502E+00 | 8.6075E+00 | −2.1572E+01 | 3.6088E+01 |
| S3 | 7.7425E−03 | 3.9903E−02 | −4.4006E−01 | 3.3108E+00 | −1.3052E+01 |
| S4 | 1.0356E−01 | 1.1180E−01 | 3.6045E−01 | −9.8732E+00 | 8.1591E+01 |
| S5 | 5.3960E−02 | −2.6430E+00 | 6.8590E+01 | −1.0822E+03 | 1.0220E+04 |
| S6 | −2.8677E−01 | 6.9502E−01 | −6.1920E+00 | 4.3302E+01 | −2.2137E+02 |
| S7 | −6.6947E−01 | 2.1962E+00 | −1.8144E+01 | 9.2538E+01 | −2.8297E+02 |
| S8 | −2.8029E−01 | 7.5982E−02 | 7.9367E−01 | −1.7470E+00 | −3.5877E−01 |
| S9 | −1.1349E−01 | 5.6369E−01 | −1.1093E+00 | 9.1019E−01 | −1.5313E−01 |
| S10 | −4.5025E−01 | 1.5978E+00 | −3.6337E+00 | 5.7879E+00 | −6.0802E+00 |
| S11 | −6.5456E−02 | −4.6094E−01 | 5.8138E−01 | −3.3420E−01 | 1.0585E−01 |
| S12 | −3.0451E−01 | 1.5684E−01 | −5.2432E−02 | 1.0794E−02 | 2.1624E−04 |

| Surface No. | A14 | A16 | A18 | A20 |
|---|---|---|---|---|
| S1 | −1.2674E−02 | 2.0734E−03 | −1.9605E−04 | 8.1658E−06 |
| S2 | −3.8763E+01 | 2.5610E+01 | −9.4424E+00 | 1.4807E+00 |
| S3 | 2.8887E+01 | −3.6133E+01 | 2.3511E+01 | −6.1465E+00 |
| S4 | −3.3755E+02 | 7.3561E+02 | −8.1128E+02 | 3.5834E+02 |
| S5 | −5.9388E+04 | 2.0747E+05 | −3.9977E+05 | 3.2609E+05 |
| S6 | 7.1770E+02 | −1.3988E+03 | 1.4890E+03 | −6.6785E+02 |
| S7 | 5.0811E+02 | −4.9890E+02 | 2.0896E+02 | −1.9791E+00 |
| S8 | 5.9023E+00 | −8.4863E+00 | 5.1344E+00 | −1.1732E+00 |
| S9 | −2.5525E−01 | 1.8792E−01 | −5.1833E−02 | 5.2882E−03 |
| S10 | 4.0502E+00 | −1.6301E+00 | 3.6031E−01 | −3.3554E−02 |
| S11 | −1.8936E−02 | 1.7938E−03 | −7.0350E−05 | 8.2305E−08 |
| S12 | −1.0501E−03 | 3.0890E−04 | −3.7546E−05 | 1.6868E−06 |

Figure 12A:
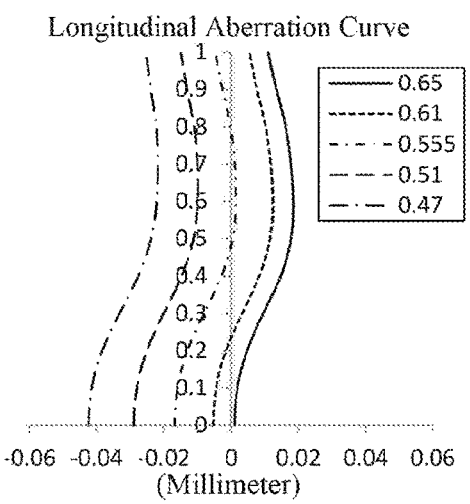
FIGS. 12A to 12D show a longitudinal aberration curve, an astigmatic curve, a distortion curve, and a lateral color curve, respectively, of the optical imaging lens assembly of Example 6.
Figure 12B:
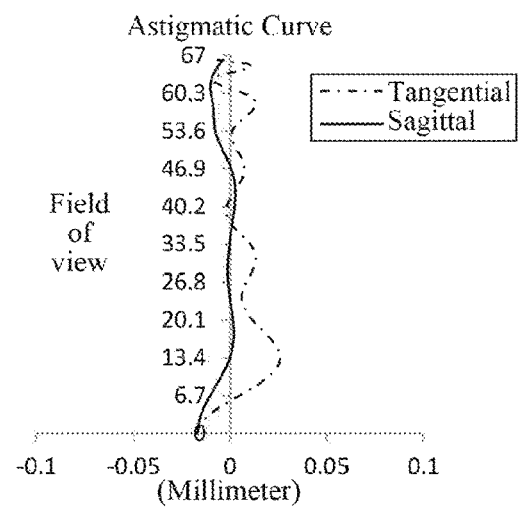
Figure 12C:
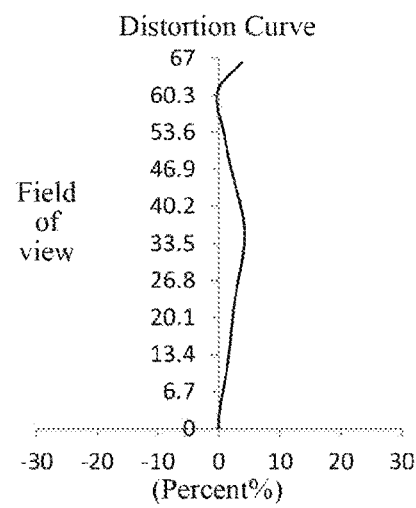
Figure 12D:
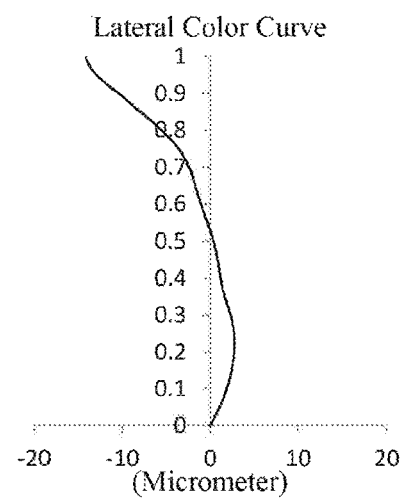

FIG. 12A illustrates a longitudinal aberration curve of the optical imaging lens assembly according to example 6, representing deviations of focal points converged by light of different wavelengths after passing through the optical imaging lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion at different field-of-view angles. FIG. 12D illustrates a lateral color curve of the optical imaging lens assembly according to example 6, representing deviations of different image heights on an imaging plane after light passes through the optical imaging lens assembly. As can be seen from FIGS. 12A to 12D, the optical imaging lens assembly according to Example 6 can achieve good imaging quality.

Example 7

Figure 13:
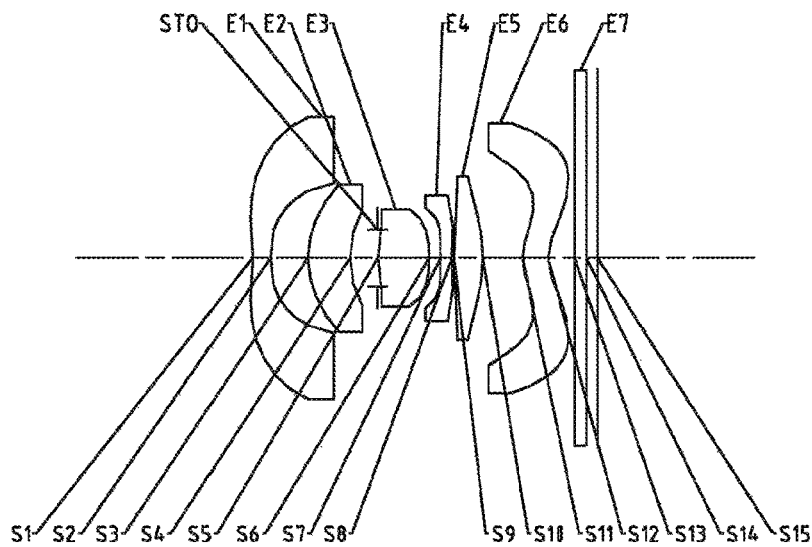
FIG. 13 shows a schematic structural diagram of an optical imaging lens assembly according to Example 7 of the present disclosure.

An optical imaging lens assembly according to Example 7 of the present disclosure is described below with reference to FIGS. 13 to 14D. FIG. 13 shows a schematic structural diagram of an optical imaging lens assembly according to Example 7 of the present disclosure.

As shown in FIG. 13, the optical imaging lens assembly includes a first lens E1, a second lens E2, a stop STO, a third lens E3, a fourth lens E4, a fifth lens E5, a sixth lens E6, a filter E7, and an imaging plane S15, which are sequentially arranged from an object side to an image side along an optical axis.

The first lens E1 has a negative refractive power, an object-side surface S1 thereof is a concave surface and an image-side surface S2 thereof is a concave surface. The second lens E2 has a positive refractive power, an object-side surface S3 thereof is a convex surface and an image-side surface S4 thereof is a concave surface. The third lens E3 has a positive refractive power, an object-side surface S5 thereof is a convex surface and an image-side surface S6 thereof is a convex surface. The fourth lens E4 has a positive refractive power, an object-side surface S7 thereof is a convex surface and an image-side surface S8 thereof is a concave surface. The fifth lens E5 has a positive refractive power, an object-side surface S9 thereof is a convex surface and an image-side surface S10 thereof is a convex surface. The sixth lens E6 has a positive refractive power, an object-side surface S11 thereof is a convex surface and an image-side surface S12 thereof is a concave surface. The filter E7 has an object-side surface S13 and an image-side surface S14. Light from the object sequentially passes through the respective surfaces S1 to S14 and is finally imaged on the imaging plane S15.

In the present example, a total effective focal length of the optical imaging lens assembly satisfies f=1.57 mm, a distance from the object-side surface S1 of the first lens E1 to the imaging plane S15 along the optical axis satisfies TTL=5.96 mm, half of a diagonal length of an effective pixel area on the imaging plane S15 satisfies ImgH=3.24 mm, half of a maximum field-of-view angle of the optical imaging lens assembly satisfies HFOV=64.0°, and an aperture number of the optical imaging lens assembly satisfies Fno=2.30.

Table 13 shows a basic parameter table of the optical imaging lens assembly of Example 7, wherein the radius of curvature, the thickness and the focal length are all in units of millimeters (mm).

TABLE 13

| Surface No. | Surface type | Radius of curvature | Thickness/ Distance | Material Refractive index | Abbe number | Focal length | Conic coefficient |
|---|---|---|---|---|---|---|---|
| OBJ | Spherical | Infinity | Infinity | | | | |
| S1 | Aspheric | −2.1530 | 0.3101 | 1.55 | 56.11 | −2.40 | −39.5805 |
| S2 | Aspheric | 3.5027 | 0.6467 | | | | 6.3252 |
| S3 | Aspheric | 1.6220 | 0.7305 | 1.68 | 19.25 | 6.92 | 0.2993 |
| S4 | Aspheric | 2.0285 | 0.4727 | | | | 0.5926 |
| STO | Spherical | Infinity | 0.0100 | | | | |
| S5 | Aspheric | 2.3280 | 0.8887 | 1.55 | 56.11 | 2.43 | −3.2010 |
| S6 | Aspheric | −2.6614 | 0.1932 | | | | 5.2047 |
| S7 | Aspheric | 5.6972 | 0.2000 | 1.68 | 19.25 | 65.49 | −3.1463 |
| S8 | Aspheric | 6.4438 | 0.0349 | | | | 0.2854 |
| S9 | Aspheric | 64.3966 | 0.4993 | 1.55 | 56.11 | 6.52 | −99.0000 |
| S10 | Aspheric | −3.7574 | 0.6783 | | | | 1.3332 |
| S11 | Aspheric | 0.9317 | 0.4412 | 1.55 | 56.11 | 70.15 | −4.3644 |
| S12 | Aspheric | 0.7952 | 0.4556 | | | | −1.6075 |
| S13 | Spherical | Infinity | 0.2100 | 1.52 | 64.17 | | |
| S14 | Spherical | Infinity | 0.1911 | | | | |
| S15 | Spherical | Infinity | | | | | |

In Example 7, the object-side surface and the image-side surface of any one of the first lenses E1 to the sixth lens E6 are aspheric surfaces. Table 14 below shows the high-order coefficients A4, A6, A8, A10, A12, A14, A16, A18 and A20 that can be applicable to each aspheric surface S1-S12 in Example 7.

TABLE 14

| Surface No. | A4 | A6 | A8 | A10 | A12 |
|---|---|---|---|---|---|
| S1 | 1.7882E−01 | −1.5568E−01 | 9.9603E−02 | −4.3894E−02 | 1.3344E−02 |
| S2 | 6.2145E−01 | −1.4902E+00 | 3.8822E+00 | −7.8049E+00 | 1.0736E+01 |
| S3 | −6.4229E−03 | −1.1864E−01 | 4.4024E−01 | −1.1363E+00 | 1.9715E+00 |
| S4 | 7.0353E−02 | −2.7441E−03 | −3.1600E−01 | 4.5525E+00 | −2.2422E+01 |
| S5 | 4.3433E−02 | −1.4375E+00 | 2.6400E+01 | −2.9758E+02 | 2.0248E+03 |
| S6 | −3.6925E−01 | 8.0492E−01 | −4.6203E+00 | 1.9045E+01 | −5.7295E+01 |
| S7 | −5.5686E−01 | 6.5177E−01 | −6.1867E+00 | 3.1216E+01 | −9.4687E+01 |
| S8 | 1.7800E−01 | −1.7695E+00 | 4.3433E+00 | −6.7432E+00 | 6.9952E+00 |
| S9 | 3.9066E−01 | −1.3173E+00 | 2.4641E+00 | −2.9649E+00 | 2.3661E+00 |
| S10 | −2.6494E−01 | 6.3517E−01 | −1.0854E+00 | 1.4495E+00 | −1.3506E+00 |
| S11 | −2.1034E−02 | −4.8737E−01 | 8.4179E−01 | −8.3628E−01 | 5.1847E−01 |
| S12 | −4.2630E−01 | 3.3511E−01 | −1.7220E−01 | 5.2861E−02 | −8.3431E−03 |

| Surface No. | A14 | A16 | A18 | A20 |
|---|---|---|---|---|
| S1 | −2.7363E−03 | 3.6005E−04 | −2.7365E−05 | 9.1290E−07 |
| S2 | −9.6043E+00 | 5.3460E+00 | −1.6781E+00 | 2.2671E−01 |
| S3 | −2.1396E+00 | 1.3571E+00 | −4.6035E−01 | 6.4520E−02 |
| S4 | 5.4673E+01 | −7.2031E+01 | 4.9083E+01 | −1.3605E+01 |
| S5 | −8.5267E+03 | 2.1658E+04 | −3.0400E+04 | 1.8052E+04 |
| S6 | 1.1590E+02 | −1.4989E+02 | 1.1164E+02 | −3.6717E+01 |
| S7 | 1.7507E+02 | −1.9348E+02 | 1.1639E+02 | −2.8777E+01 |
| S8 | −4.5840E+00 | 1.7076E+00 | −2.6919E−01 | −1.9422E−03 |
| S9 | −1.2358E+00 | 4.0249E−01 | −7.3704E−02 | 5.7741E−03 |
| S10 | 8.3429E−01 | −3.2333E−01 | 7.0654E−02 | −6.6074E−03 |
| S11 | −2.0126E−01 | 4.7202E−02 | −6.0815E−03 | 3.2941E−04 |
| S12 | 6.6264E−05 | 2.0426E−04 | −3.0853E−05 | 1.4950E−06 |

Figure 14A:
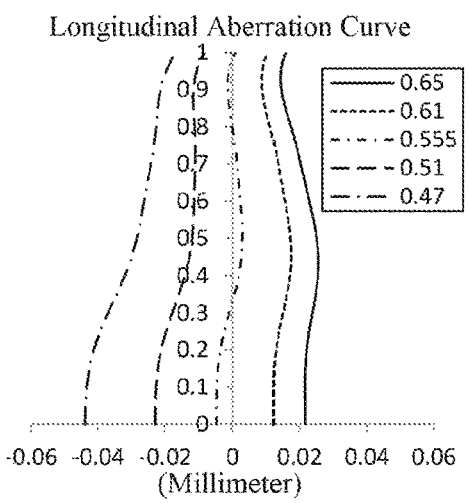
FIGS. 14A to 14D show a longitudinal aberration curve, an astigmatic curve, a distortion curve, and a lateral color curve, respectively, of the optical imaging lens assembly of Example 7.
Figure 14B:
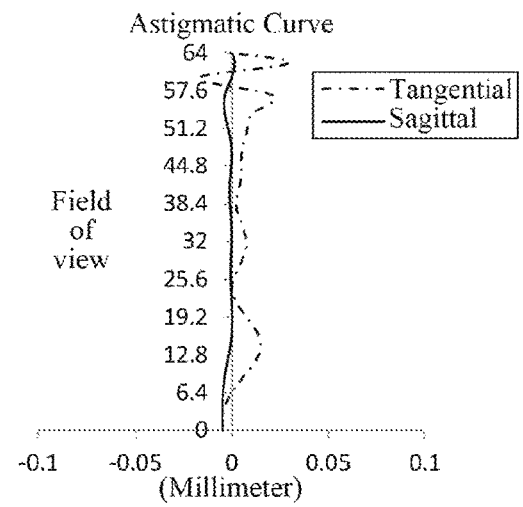
Figure 14C:
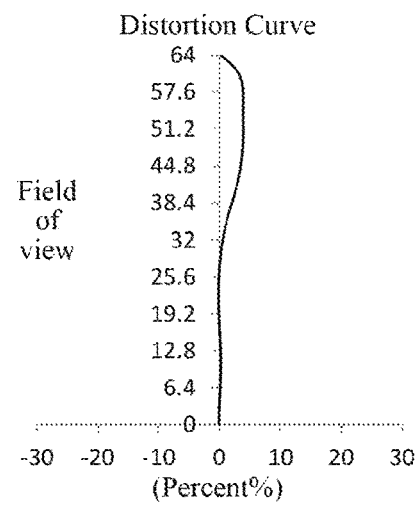
Figure 14D:
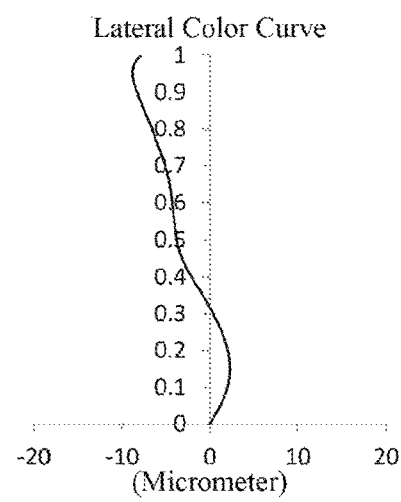

FIG. 14A illustrates a longitudinal aberration curve of the optical imaging lens assembly according to example 7, representing deviations of focal points converged by light of different wavelengths after passing through the optical imaging lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion at different field-of-view angles. FIG. 14D illustrates a lateral color curve of the optical imaging lens assembly according to example 7, representing deviations of different image heights on an imaging plane after light passes through the optical imaging lens assembly. As can be seen from FIGS. 14A to 14D, the optical imaging lens assembly according to Example 7 can achieve good imaging quality.

In view of the above, Examples 1 to 7 satisfy the relationships shown in Table 15, respectively.

TABLE 15

| Conditional/ embodiment | 1 | 2 | 3 | 4 | 5 | 6 | 7 |
|---|---|---|---|---|---|---|---|
| TTL/ImgH | 1.71 | 1.72 | 1.84 | 1.64 | 1.84 | 1.58 | 1.84 |
| \|R1/f1\| | 0.93 | 0.93 | 0.95 | 0.54 | 0.89 | 0.92 | 0.90 |
| f3/(R5 − R6) | 0.46 | 0.46 | 0.49 | 0.46 | 0.49 | 0.46 | 0.49 |
| (f5/f6)*f (mm) | 0.23 | 0.15 | 0.14 | 0.08 | 0.10 | 0.05 | 0.15 |
| (R11 + R12)/f | 0.93 | 0.89 | 0.86 | 0.81 | 0.83 | 0.87 | 1.10 |
| R10/f5 | −0.78 | −0.94 | −0.96 | −0.74 | −0.87 | −0.56 | −0.58 |
| DT11/DT62 | 0.80 | 0.78 | 0.84 | 0.78 | 0.74 | 0.83 | 1.05 |
| SAG41/SAG52 | 0.40 | 0.40 | 0.50 | 0.39 | 0.52 | 0.70 | 1.00 |
| (T12 + T23 + T34)/TTL | 0.24 | 0.24 | 0.26 | 0.23 | 0.27 | 0.24 | 0.22 |
| (CT2 + CT4)/CT3 | 0.98 | 0.96 | 0.84 | 0.94 | 0.60 | 0.96 | 1.05 |
| CT1/CT6 | 0.77 | 0.86 | 1.50 | 0.80 | 1.42 | 0.92 | 0.70 |

The foregoing is only a description of the preferred examples of the present disclosure and the applied technical principles. It should be appreciated by those skilled in the art that the protected scope of the present disclosure is not limited to the technical solutions formed by the particular combinations of the above technical features. The protected scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
   a first lens having a refractive power with a concave image-side surface;
   a second lens having a refractive power;
   a third lens having a positive refractive power;
   a fourth lens having a refractive power;
   a fifth lens having a positive refractive power with a convex image-side surface; and
   a sixth lens having a positive refractive power with a convex object-side surface and a concave image-side surface,
   wherein,
   half of a maximum field-of-view angle HFOV of the optical imaging lens assembly satisfies: HFOV>55°,
   a distance TTL from an object-side surface of the first lens to an imaging plane of the optical imaging lens assembly along the optical axis and half of a diagonal length ImgH of an effective pixel area on the imaging plane of the optical imaging lens assembly satisfy: 1.2<TTL/ImgH<2.3, and
   a radius of curvature R5 of an object-side surface of the third lens, a radius of curvature R6 of an image-side surface of the third lens, and an effective focal length f3 of the third lens satisfy: 0.2<f3/(R5−R6)<0.6.

2. The optical imaging lens assembly according to claim 1, wherein a maximum effective radius DT11 of the object-side surface of the first lens and a maximum effective radius DT62 of the image-side surface of the sixth lens satisfy:

$0.5<DT11/DT62≤1.05.$

3. The optical imaging lens assembly according to claim 1, wherein a radius of curvature R1 of the object-side surface of the first lens and an effective focal length f1 of the first lens satisfy:

$0.54≤|R1/f1|<1.2.$

4. The optical imaging lens assembly according to claim 1, wherein an on-axis distance SAG41 from an intersection of an object-side surface of the fourth lens and the optical axis to a vertex of an effective radius of the object-side surface of the fourth lens, and an on-axis distance SAG52 from an intersection of the image-side surface of the fifth lens and the optical axis to a vertex of an effective radius of the image-side surface of the fifth lens satisfy:

$0<SAG41/SAG52≤1.$

5. The optical imaging lens assembly according to claim 1, wherein an effective focal length f5 of the fifth lens, an effective focal length f6 of the sixth lens, and a total effective focal length f of the optical imaging lens assembly satisfy:

$0<(f5/f6)*f<0.5$ mm.

6. The optical imaging lens assembly according to claim 1, wherein a radius of curvature R10 of the image-side surface of the fifth lens and an effective focal length f5 of the fifth lens satisfy:

$-0.96≤R10/f5<0.1.$

7. The optical imaging lens assembly according to claim 1, wherein a radius of curvature R11 of the object-side surface of the sixth lens, a radius of curvature R12 of the image-side surface of the sixth lens, and a total effective focal length f of the optical imaging lens assembly satisfy:

$0.5<(R11+R12)/f≤1.1.$

8. The optical imaging lens assembly according to claim 1, wherein a center thickness CT2 of the second lens along the optical axis, a center thickness CT3 of the third lens along the optical axis, and a center thickness CT4 of the fourth lens along the optical axis satisfy:

$0.4<(CT2+CT4)/CT3<1.2.$

9. The optical imaging lens assembly according to claim 1, wherein a center thickness CT1 of the first lens along the optical axis and a center thickness CT6 of the sixth lens along the optical axis satisfy:

$0.5<CT1/CT6≤1.5.$

10. An optical imaging lens assembly, sequentially from an object side to an image side of the optical imaging lens assembly along an optical axis, comprising:
   a first lens having a refractive power with a concave image-side surface;
   a second lens having a refractive power;

a third lens having a positive refractive power;
a fourth lens having a refractive power;
a fifth lens having a positive refractive power with a convex image-side surface; and
a sixth lens having a positive refractive power with a convex object-side surface and a concave image-side surface, wherein, half of a maximum field-of-view angle HFOV of the optical imaging lens assembly satisfies: HFOV>55°, a spaced interval T12 between the first lens and the second lens along the optical axis, a spaced interval T23 between the second lens and the third lens along the optical axis, a spaced interval T34 between the third lens and the fourth lens along the optical axis, and a distance TTL from an object-side surface of the first lens to an imaging plane of the optical imaging lens assembly along the optical axis satisfy: 0<(T12+T23+T34)/TTL<0.5, and a radius of curvature R5 of an object-side surface of the third lens, a radius of curvature R6 of an image-side surface of the third lens, and an effective focal length f3 of the third lens satisfy: 0.2<f3/(R5−R6)<0.6.

11. The optical imaging lens assembly according to claim 10, wherein a maximum effective radius DT11 of the object-side surface of the first lens and a maximum effective radius DT62 of the image-side surface of the sixth lens satisfy:

0.5<$DT11/DT62$≤1.05.

12. The optical imaging lens assembly according to claim 10, wherein a radius of curvature R1 of the object-side surface of the first lens and an effective focal length f1 of the first lens satisfy:

0.54≤|$R1/f1$|<1.2.

13. The optical imaging lens assembly according to claim 10, wherein an on-axis distance SAG41 from an intersection of an object-side surface of the fourth lens and the optical axis to a vertex of an effective radius of the object-side surface of the fourth lens, and an on-axis distance SAG52 from an intersection of the image-side surface of the fifth lens and the optical axis to a vertex of an effective radius of the image-side surface of the fifth lens satisfy:

0<$SAG41/SAG52$≤1.

14. The optical imaging lens assembly according to claim 10, wherein an effective focal length f5 of the fifth lens, an effective focal length f6 of the sixth lens, and a total effective focal length f of the optical imaging lens assembly satisfy:

0<($f5/f6$)*$f$<0.5 mm.

15. The optical imaging lens assembly according to claim 10, wherein a radius of curvature R10 of the image-side surface of the fifth lens and an effective focal length f5 of the fifth lens satisfy:

−0.96≤$R10/f5$<0.1.

16. The optical imaging lens assembly according to claim 10, wherein a radius of curvature R11 of the object-side surface of the sixth lens, a radius of curvature R12 of the image-side surface of the sixth lens, and a total effective focal length f of the optical imaging lens assembly satisfy:

0.5<($R11+R12$)/$f$≤1.1.

17. The optical imaging lens assembly according to claim 10, wherein a center thickness CT2 of the second lens along the optical axis, a center thickness CT3 of the third lens along the optical axis, and a center thickness CT4 of the fourth lens along the optical axis satisfy:

0.4<($CT2+CT4$)/$CT3$<1.2.

18. The optical imaging lens assembly according to claim 10, wherein a center thickness CT1 of the first lens along the optical axis and a center thickness CT6 of the sixth lens along the optical axis satisfy:

0.5<$CT1/CT6$≤1.5.

* * * * *